United States Patent
Pantaleoni

(10) Patent No.: US 12,067,667 B2
(45) Date of Patent: Aug. 20, 2024

(54) USING DIRECTIONAL RADIANCE FOR INTERACTIONS IN PATH TRACING

(71) Applicant: NVIDIA Corporation, Santa Clara, CA (US)

(72) Inventor: Jacopo Pantaleoni, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 33 days.

(21) Appl. No.: 17/321,202

(22) Filed: May 14, 2021

(65) Prior Publication Data
US 2021/0358198 A1    Nov. 18, 2021

Related U.S. Application Data

(60) Provisional application No. 63/025,189, filed on May 15, 2020.

(51) Int. Cl.
| | |
|---|---|
| G06T 15/06 | (2011.01) |
| G06T 15/50 | (2011.01) |
| G06T 17/20 | (2006.01) |

(52) U.S. Cl.
CPC ............ *G06T 15/06* (2013.01); *G06T 15/506* (2013.01); *G06T 17/20* (2013.01)

(58) Field of Classification Search
CPC ........ G06T 15/06; G06T 15/50; G06T 15/506
See application file for complete search history.

(56) References Cited

U.S. PATENT DOCUMENTS

| | | |
|---|---|---|
| 7,199,795 B2 | 4/2007 | Christensen et al. |
| 8,207,968 B1 | 6/2012 | Krishnaswamy et al. |
| 8,223,148 B1 | 7/2012 | Carr et al. |
| (Continued) | | |

FOREIGN PATENT DOCUMENTS

EP    3 220 356 A1    9/2017

OTHER PUBLICATIONS

Gassenbauer, Václav, Jaroslav Křivánek, and Kadi Bouatouch. "Spatial directional radiance caching." Computer Graphics Forum. vol. 28. No. 4. Oxford, UK: Blackwell Publishing Ltd, 2009. (Year: 2009).*

(Continued)

*Primary Examiner* — Ryan McCulley
(74) *Attorney, Agent, or Firm* — Taylor English Duma L.L.P.

(57) ABSTRACT

Disclosed approaches provide for interactions of light transport paths in a virtual environment to share directional radiance when rendering a scene. Directional radiance that may be shared includes outgoing directional radiance of interactions, incoming directional radiance of interactions, and/or information derived therefrom. The shared directional radiance may be used for various purposes, such as computing lighting contributions at one or more interactions of a light transport path, and/or for path guiding. Directional radiance of an interaction may be shared with another interaction when the interaction is sufficiently similar (e.g., in radiance direction) to serve as an approximation of a sample for the other interaction. Sharing directional radiance may provide for online learning of directional radiance, which may build finite element approximations of light fields at the interactions.

21 Claims, 10 Drawing Sheets

(56) References Cited

U.S. PATENT DOCUMENTS

| | | |
|---|---|---|
| 8,314,797 B1 | 11/2012 | Krishnaswamy et al. |
| 9,953,457 B2 | 4/2018 | Keller et al. |
| 10,679,407 B2 | 6/2020 | Schissler et al. |
| 10,952,302 B2 | 3/2021 | Ashdown et al. |
| 2004/0125103 A1 | 7/2004 | Kaufman et al. |
| 2007/0206008 A1 | 9/2007 | Kaufman et al. |
| 2008/0122846 A1 | 5/2008 | Brown et al. |
| 2009/0167763 A1 | 7/2009 | Waechter et al. |
| 2010/0164948 A1 | 7/2010 | Kho et al. |
| 2013/0176313 A1 | 7/2013 | Gautron et al. |
| 2016/0005217 A1 | 1/2016 | Tokuyoshi |
| 2018/0061111 A1 | 3/2018 | Engel et al. |
| 2018/0096516 A1* | 4/2018 | Luebke ................. G06T 15/06 |
| 2018/0315251 A1 | 11/2018 | Sun et al. |
| 2020/0035014 A1 | 1/2020 | Pantaleoni |

OTHER PUBLICATIONS

Gautron, Pascal, Kadi Bouatouch, and Sumanta Pattanaik. "Temporal radiance caching." ACM SIGGRAPH 2006 Sketches. 2006. 171-es. (Year: 2006).*

Lehtinen, Jaakko, et al. Meshless finite elements for hierarchical global illumination. Diss. Publications in Telecommunications Software and Multimedia, Helsinki University of Technology, 2007. (Year: 2007).*

Muñoz, Adolfo. "Differential ray marching." (2012). (Year: 2012).*

Bekaert, Philippe, Mateu Sbert, and John H. Halton. "Accelerating Path Tracing by Re-Using Paths." Rendering Techniques 2 (2002): 125-134. (Year: 2002).*

Meißner, M., et al., "VIZARD II, a PCI Card for Real-Time Volume Rendering", In Proceedings of the Siggraph/Eurographics Workshop on Graphics Hardware, Retrived from Internet URL: http://www.gris.uni-tuebingen.de, pp. 1-7 (1998).

Notice of Allowance dated Sep. 29, 2021 in U.S. Appl. No. 16/523,368, 9 pages.

International Preliminary Report on Patentability received for PCT Application No. PCT/US2020/046816, mailed on Mar. 3, 2022, 8 pages.

Preinterview First Office Action dated Apr. 1, 2022 in U.S. Appl. No. 16/996,045, 4 pages.

Bekaert, P., et al., "A custom designed density estimation method for light transport," Research Report MPI-I-2003-4-004, Max-Planck-Institut fur Informatik, Stuhlsatzenhausweg 85, 66123 Saarbrucken, Germany, pp. 28 (2003).

Binder, N., et al., "Fast path space filtering by jittered spatial hashing," In ACM SIGGRAPH 2018 Talks, Article No. 71, pp. 1-2 (2018).

Bitterli, B., "Rendering resources," published on 2016, accessed at https://benedikt-bitterli.me/resources/, accessed on May 18, 2021, pp. 7.

Bitterli, B., et al., "Reversible jump metropolis light transport using inverse mappings," ACM Transactions on Graphics, vol. 37, 1, pp. 1:1-1:12 (Oct. 2017).

Chaos Group, "Light Cache GI," published on 2008, accessed at http://web.archive.org/web/20200519015348/https://docs.chaosgroup.com/display/VRAYSKETCHUP/Light+Cache+GI, accessed on May 18, 2021, pp. 2.

Clarberg, P., et al., "Wavelet importance sampling: Efficiently evaluating products of complex functions," In ACM SIGGRAPH 2005 Papers, pp. 1166-1175 (2005).

Dahm, K., and Keller, A., "Learning light transport the reinforced way," In ACM SIGGRAPH 2017 Talks, Article No. 73, pp. 15 (2017).

Hachisuka, T., and Jensen, H. W., "Stochastic progressive photon mapping," ACM SIGGRAPH Asia, Article No. 141, vol. 28, No. 5, pp. 1-8 (Dec. 2009).

Hachisuka, T., et al., "A path space extension for robust light transport simulation," ACM Transactions on Graphics, Article No. 191, vol. 31, No. 6, pp. 1-10 (2012).

Hachisuka, T., et al., "Progressive photon mapping," ACM Trans. Graph., Article No. 130, vol. 27, No. 5, pp. 1-8 (2008).

Hanika, J., et al., "Improved half vector space light transport," Computer Graphics Forum (Proceedings of Eurographics Symposium on Rendering), vol. 34, No. 4, pp. 65-74 (2015).

Hanika, J., et al., "Manifold next event estimation," Computer Graphics Forum, vol. 34, No. 4, pp. 87-97 (2015).

He, H.Y., and Owen, A. B., "Optimal mixture weights in multiple importance sampling," Research report, pp. 22 (Nov. 2014).

Hierholz, S., et al., "Product importance sampling for light transport path guiding," Comput. Graph. Forum, vol. 35, No. 4, pp. 67-77 (2016).

Ivo, K., et al., "Optimal multi-ple importance sampling," ACM Transactions on Graphics (Proceedings of SIGGRAPH 2019), vol. 38, No. 4, Article No. 37, pp. 1-14 (Jul. 2019).

Jakob, W., and Marschner, S., "Manifold exploration: A markov chain monte carlo technique for rendering scenes with difficult specular transport," ACM Transactions on Graphics, vol. 31, No. 4, Article No. 58, pp. 1-13 (2012).

Kajiya, J. T., "The rendering equation," In Proceedings of the 13th Annual Conference on Computer Graphics and Interactive Techniques, ACM SIGGRAPH Computer Graphics, vol. 20, No. 4, pp. 143-150 (Aug. 18-22, 1986).

Kaplanyan, A. S., et al., "The natural-constraint representation of the path space for efficient light transport simulation," ACM Transactions on Graphics (Proc. SIGGRAPH), vol. 33, No. 4, pp. 1-13 (2014).

Karlík, O., et al., "Mis compensation: Optimizing sampling techniques in multiple importance sampling," ACM Transactions on Graphics, vol. 38, No. 6, Article No. 151, pp. 12 (Nov. 2019).

Kelemen, C., et al., "A simple and robust mutation strategy for the Metropolis light transport algorithm," In Computer Graphics Forum, pp. 531-540 (2002).

Keller, A., et al., "Path space filtering," In ACM SIGGRAPH 2014 Talks, Article No. 68, pp. 12 (2014).

Lafortune, E.P., and Willems, Y.D., "Reducing the number of shadow rays in bidirectional path tracing," Winter School of Computer Graphics and Visualisation 95 Third International Conference in Central Europe, vol. 2, pp. 1-9 (Jan. 1, 1995).

Laurijssen, J., et al., "Fast Estimation and Rendering of Indirect Highlights," Computer Graphics Forum, vol. 29, No. 4, pp. 1305-1313 (Jun. 26, 2010).

Li, W., et al., "Two-stage importance sampling with mixture proposals," Journal of the American Statistical Association, vol. 108, No. 504, pp. 1350-1365 (Dec. 2013).

Liktor, G., and Dachsbacher, C., "Decoupled deferred shading for hardware rasterization," Proceedings of the ACM SIGGRAPH Symposium on Interactive 3D Graphics and Games, pp. 143-150 (Mar. 9, 2012).

Müller, T., et al., "Neural importance sampling," ACM Transactions on Graphics, vol. 38, No. 5, Article No. 145, pp. 1-19 (2019).

Müller, T., et al., "Practical path guiding for efficient light-transport simulation," Comput. Graph. Forum, vol. 36, No. 4, pp. 91-100 (2017).

Munkberg, J., et al., "Texture space caching and reconstruction for ray tracing," ACM Transactions on Graphics, ACM, vol. 35, No. 6, pp. 1-13 (Nov. 11, 2016).

Owen, A., and Zhou, Y., "Safe and effective importance sampling," Journal of the American Statistical Association, vol. 95, No. 449, pp. 135-143 (Mar. 2000).

Pantaleoni, J., "Charted metropolis light transport," ACM Transactions on Graphics, vol. 36, No. 4, Article No. 75, pp. 15 (2017).

Philippe, B., et al., "Accelerating Path Tracing by Re-Using Paths," EGRW '02: Proceedings of the 13th Eurographics workshop on Rendering, pp. 125-134 (2002).

Sbert, M., and Elvira, V., "Generalizing the Balance Heuristic Estimator in Multiple Importance Sampling," Computation, arXiv:1903.11908, p. 36 (2019).

Veach, E., "Robust Monte Carlo Methods for Light Transport Simulation," PhD thesis, Stanford University, pp. 432 (1997).

(56) References Cited

OTHER PUBLICATIONS

Veach, E., and Guibas, L. J., "Metropolis light transport," In Proceedings of the 24th Annual Conference on Computer Graphics and Interactive Techniques, ACM Press/Addison-Wesley Publishing Co., pp. 65-76 (1997).
Vorba, J., and Křivánek, J., "Adjoint-driven russian roulette and splitting in light transport simulation," ACM Transactions on Graphics, vol. 35, No. 4, Article No. 42, pp. 1-11 (2016).
Vorba, J., et al., "On-line learning of parametric mixture models for light transport simulation," ACM Transactions on Graphics (Proceedings of SIGGRAPH 2014), vol. 33, No. 4, p. 11 (2014).
Vorba, J., et al., "Path tracing in production," SIGGRAPH '19: ACM SIGGRAPH 2019 Courses, Article No. 18, pp. 18:1-18:77 (2019).
International Search Report and Written Opinion mailed Oct. 14, 2019 in International Patent Application No. PCT/US2019/043673, 12 pages.
Preinterview First Office Action dated Sep. 2, 2020 in U.S. Appl. No. 16/523,368, 4 pages.
International Search Report and Written Opinion received for PCT Application No. PCT/US2020/046816, mailed on Sep. 28, 2020, 9 pages.
First Action Interview Office Action dated Oct. 20, 2020 in U.S. Appl. No. 16/523,368, 4 pages.
Final Office Action dated Dec. 11, 2020 in U.S. Appl. No. 16/523,368, 29 pages.
International Preliminary Report on Patentability received for PCT Application No. PCT/US2019/043673, mailed on Feb. 4, 2021, 9 pages.
Non-Final Office Action dated May 14, 2021 in U.S. Appl. No. 16/523,368, 35 pages.
Keller, A., et al., "Efficient Monte Carlo and Quasi-Monte Carlo Rendering Techniques", Eurographics, Tutorial, pp. 1-599 (2003).
Lafortune, P., E., and Yves, D., W., "A 5D Tree to Reduce the Variance of Monte Carlo Ray Tracing", 6th Eurographics Workshop on Rendering, pp. 1-11 (1995).
International Search Report and Written Opinion received for PCT Patent Application No. PCT/US2021/032608, mailed on Oct. 1, 2021, 20 pages.
Pantaleoni, Jacopo; International Preliminary Report on Patentability for PCT Application No. PCT/US2021/032608, filed May 14, 2021, mailed Nov. 24, 2022, 17 pgs.

\* cited by examiner

USING DIRECTIONAL RADIANCE FOR INTERACTIONS IN PATH TRACING

CROSS-REFERENCE TO RELATED APPLICATIONS

This application claims the benefit of U.S. Provisional Application No. 63/025,189, filed May 15, 2020, titled "Online path sampling control with Progressive Spatio-Temporal Filtering" which is hereby incorporated by reference in its entirety.

BACKGROUND

Global illumination is used in image rendering applications to simulate lighting conditions in a virtual environment by taking into account not only light that comes directly from a light source (direct illumination), but also light that is reflected off of surfaces (indirect illumination). Path tracing is an approach to global illumination in which lighting contributions at different points along ray-traced light transport paths (usually having of an initial or primary ray and a number of reflected or secondary rays) may be combined to determine lighting conditions observed by a viewpoint camera.

Conventional approaches to path tracing require a large amount of rays to sample lighting conditions for each pixel in order for the pixel to accurately reflect lighting conditions in the virtual environment. For example, in a light transport path, a ray may interact with a diffuse surface where the directional radiance that is sampled only accounts for one direction (of many possible directions) in which light particles may scatter from the surface. Many secondary rays (e.g., rays other than initial or primary rays that may be propagated from a primary ray) may be cast to sample other directions to more accurately estimate the lighting contribution of the interaction to the light transport path. Due to the potentially large number of samples, the computational resources required to render such a scene may impose too great of a delay for real-time rendering applications, such as gaming.

SUMMARY

Embodiments of the present disclosure provide for using directional radiance for interactions in path tracing. In various respects, the present disclosure provides improved approaches for determining directional radiance at interactions along light transport paths that may be used for global illuminations or other ray tracing effects.

The disclosure provides for interactions of light transport paths in a virtual environment to share directional radiance in determining lighting conditions (e.g., a solution to the rendering equation) for at least one light transport path when rendering a scene. Directional radiance that may be shared includes outgoing directional radiance of interactions, incoming directional radiance of interactions, and/or information derived therefrom. The directional radiance may be used for various purposes, such as computing lighting contributions at one or more interactions of a light transport path, and/or for path guiding, such as in importance sampling.

Directional radiance of an interaction may be shared with another interaction when the interaction is sufficiently similar to serve as an approximation of a sample for the other interaction. For example, interactions may be shared based on similarities in characteristics, such as radiance direction and/or path footprint approximations at the interactions. The characteristics may define a region in which interactions may share lighting condition data. The region may correspond to a hash cell and be defined by a spatial hashing scheme, such as a hash function that is based at least on directional radiance data (data representative of directional radiance) for interactions. The directional radiance data may be accumulated to the hash cell spatially and/or temporally, and used to compute aggregate directional radiance data that estimates radiance at an interaction. In embodiments, the region provides for using directional radiance, which may build finite element approximations of light fields at interactions.

BRIEF DESCRIPTION OF THE DRAWINGS

The present systems and methods for using directional radiance for interactions in path tracing is described in detail below with reference to the attached drawing figures, wherein.

DETAILED DESCRIPTION

Figure 1:
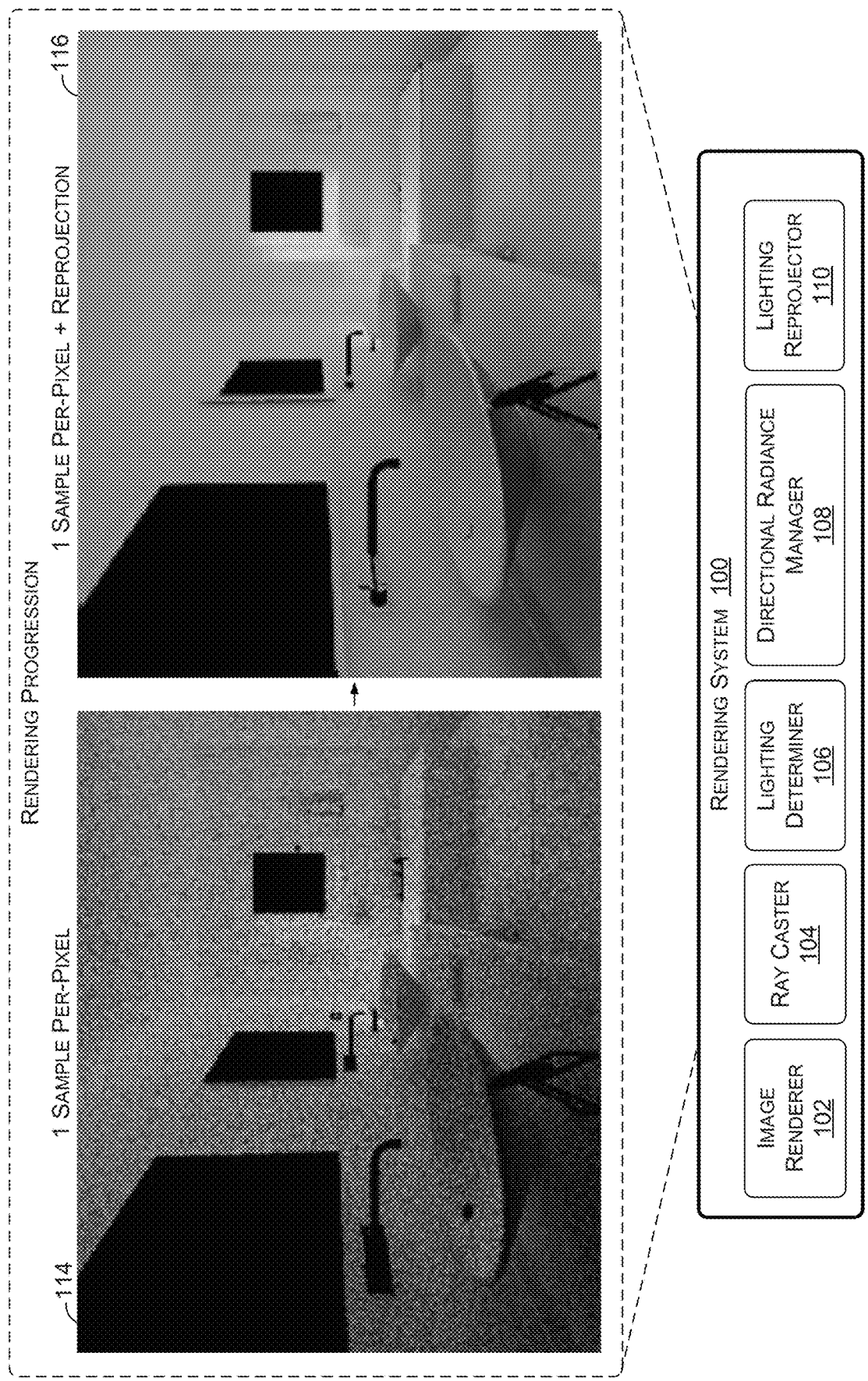
FIG. 1 is an example system diagram of a rendering system, in accordance with some embodiments of the present disclosure.

The present disclosure provides for using directional radiance for interactions in path tracing. In various respects, the disclosure provides improved approaches for determining directional radiance of interactions along light transport paths that may be used for global illuminations or other ray tracing effects.

The disclosure provides for interactions of light transport paths in a virtual environment to share lighting contributions, such as directional radiance, in determining lighting conditions for at least one light transport path and/o pixel when rendering a scene. Lighting conditions for a pixel and/or light transport path, as used herein, may refer to an aspect of a virtual environment that represents lighting information, such as radiance, irradiance, and/or a solution or partial solution to the rendering equation (either biased or unbiased), etc. for that pixel and/or light transport path. A lighting contribution for an interaction may refer to a portion of the lighting conditions contributed to by the interaction, such as radiance, irradiance, emitted spectral radiance, Bidirectional Reflectance Distribution Function (BRDF), and/or a combination thereof. Sharing directional radiance allows the system to leverage additional information and increase the effective sample count of interactions without casting additional rays from the interactions. As such, fewer samples may be needed to determine lighting conditions for pixels that accurately reflect the virtual environment.

In embodiments, directional radiance that may be shared includes outgoing directional radiance of interactions, incoming directional radiance of interactions, and/or information derived therefrom. Examples of information derived from incoming directional radiance or outgoing directional radiance include directional radiance distributions, such as products of incoming radiance and local BRDFs (e.g., a shared incoming radiance distribution), and differences between outgoing directional radiances and emitted spectral radiance (shared all radiance transported at least once). The shared directional radiance may be used for various purposes, such as computing lighting contributions at one or more interactions of a light transport path.

In some approaches, based on rays of one or more ray-traced light transport paths (e.g., cast over one or more frames) interacting with surface points in a virtual environment, directional radiances from multiple ones of the interactions (e.g., spatially and/or temporally) may be used to compute shared directional radiance. The shared directional radiance may be used as an estimate, or approximation, of local directional radiance (e.g., incoming or outgoing radiance) for an interaction in at least one light transport path. For example, aggregate directional radiance for an interaction may form a finite element of a discretized finite element solution to the rendering equation. Using disclosed approaches, all-frequency directional phenomena may be captured via finite elements, such as those due to glossy reflection and/or refraction. As such, a wide variety of lighting phenomena may be simulated using the finite elements (e.g., specular or diffuse).

Disclosed approaches provide for progressive solvers of the rendering equation, which may be used for path tracing. In embodiments, an estimator may solve the rendering equation for any number of light transport paths cast in a scene over multiple frames. For example, paths may be cast in waves (e.g., by sampling at least one path per-pixel and per-frame), and updates to shared directional radiance may be performed in a frame using the shared directional radiance approximations corresponding to the previous frame.

In at least one embodiment, shared directional radiance may be used as a control variate to compute lighting condition data (e.g., representing outgoing directional radiance) at one or more interactions of a light transport path. For example, the shared directional radiance may be used as a control variate used to determine a corresponding integral of the rendering equation. As long as the shared directional radiance and corresponding integral are correlated, the integral may be estimated with lower variance. For example, a shared incoming radiance distribution may be used as a control variate with shared all radiance transported at least once being used as a known integral to estimate all radiance transported at least once at the interaction.

In at least one embodiment, shared directional radiance may be applied to a predictor-corrector model used to compute lighting condition data (e.g., representing outgoing directional radiance) at one or more interactions of a light transport path and/or to control path guiding. The shared all radiance transported at least once for an interaction may be used in the predictor, and a difference between an incoming directional radiance distribution sampled at the interaction and a shared incoming radiance distribution (used as a control variate) from multiple interactions may be used in the corrector. This may result in faster convergence of the integral for the same number of samples.

In embodiments, in addition to or alternatively from being used to compute lighting condition data for pixels and/or light transport paths, shared directional radiance of interactions may be shared and used for path guiding, such as in importance sampling and/or as a control variate of a path sampler. For example, importance sampling may be determined from either shared incoming radiance or a shared incoming radiance distribution (e.g., a shared product of the incoming radiance and local BRDF). In implementing shared radiance data in a control variate of a path sampler, the control variate may comprise a shared incoming radiance distribution, which may be used to define a probability space for the path sampling.

To ensure directional radiances for different interactions that are shared are relevant to one another, directional radiances may be shared based on similarities between characteristics of the interactions. As an example, directional radiances for different interactions may be shared based on the relative locations of the interactions (e.g., the corresponding surface points of the interactions). For example, directional radiances for interactions within one or more defined regions of the virtual environment may be shared. In some examples, a region may be defined by a spatial hashing scheme, such as a hash function that is based at least on directional radiance data (data representative of directional radiance) for interactions. Interactions that fall within a region defined by the spatial hashing scheme may be accumulated to a hash cell(s) and used to compute an aggregate directional radiance for at least one interaction.

Other examples of characteristics that may be used to define and/or determine whether directional radiance of interactions are shared (and/or how much to weight different directional radiances when combining them) may be based on the direction of the incoming radiance of the interactions, the direction of the outgoing radiance of the interactions, the hit distance associated with the incident rays of the interactions, the length of the light transport paths up to the interactions, the number of bounces to the interactions, and/or areas of path footprint approximations that correspond to the incident rays. When values of one or more of those characteristics are within one or more threshold values of one another (e.g., evaluated for individual characteristics and/or as an aggregate value or metric such as a hash), the lighting conditions of the corresponding interactions may be shared. Discrete types of directional radiance (e.g., incoming radiance, outgoing radiance, etc.) maybe evaluated and/or shared individually (e.g., using respective evaluation criteria) and/or collectively (e.g., using shared evaluation criteria).

In further examples, the one or more of the characteristics may define a size of a defined region of the virtual environment in which the directional radiances for interactions may be shared. For example, the hit distance associated with the incident secondary rays of the interactions, the length of the light transport paths up to the interactions, the number of bounces up to the interactions, and/or areas of path footprint approximations that correspond to the incident secondary rays may be used to select and or compute the size of the defined region. In examples where a a hashing scheme is used, a hierarchy with levels of hash cells (e.g., a hierarchy of regions) may be defined, and the size may be defined by selecting a level in the hierarchy based on the one or more characteristics. The system may for each interaction select a level, and directional radiances of interactions with that selected level may have shared directional radiances when they each correspond to the region at that level. By basing the size of the region used to share directional radiances on the characteristic(s), the regions may be larger for interactions where a coarser approximation of a directional radiance is appropriate, such as to account for increased blur the farther an interaction is from the viewpoint camera.

Also described are approaches for reprojecting directional radiances of interactions to pixels to share directional radiance data from secondary bounces of light transport paths while avoiding potential over blurring. To do so, the system may reproject directional radiance data using a filter, such as a cross-bilateral filter, that is applied in screen-space to the lighting condition data of the pixels. In examples that combine the reprojection with sharing directional radiances for indirect lighting, this approach may effectively result in a hybrid between a finite-element solver, and a plain path tracer—essentially taking the finite element solution for bounces 2, . . . , N, and using raw path traced sampling (e.g., Monte Carlo) for the first bounce. This may result in the directional radiance data for the first bounce being better defined, as it will not be smoothed like the finite-element solution.

With reference to FIG. 1, FIG. 1 is an example system diagram of a rendering system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the rendering system 100 may be implemented on one or more instances of the computing device(s) 1000 of FIG. 10.

The rendering system 100 may include, among other things, an image renderer 102, a ray caster 104, a lighting determiner 106, a directional radiance manager 108, and a lighting reprojector 110. The image renderer 102 may be configured to render images of virtual environments, such as a virtual environment 200 of FIGS. 2, 3, 5, and 6. To render an image of a virtual environment, the image renderer 102 may employ the ray caster 104, the lighting determiner 106, the directional radiance manager 108, and the lighting reprojector 110. For example, the image renderer 102 may use those components to implement any of a variety of ray-tracing techniques, such as path tracing.

To render an image, the ray caster 104 may be configured to trace rays in a virtual environment to define ray-traced light transport paths (e.g., between a viewpoint camera and one or more light sources) within the virtual environment. The lighting determiner 106 may be configured to determine—based at least in part on the traced rays—data representative of directional radiances (also referred to as directional radiance data) of interactions of the ray-traced light transport paths in the virtual environment (e.g., with surfaces). The lighting determiner 106 may further aggregate the data representative of the directional radiances (e.g., incident radiance or irradiance values) to compute data representative of lighting conditions (also referred to as lighting condition data) for rendered images (e.g., for pixels). The directional radiance manager 108 may be configured to determine and/or define which of the directional radiances (e.g., each comprising one or more directional radiance values) are shared amongst the interactions in the lighting determiner 106 in computing the data representative of lighting conditions (e.g., comprising one or more lighting condition values). Additionally or alternatively, the directional radiance manager 108 may be configured to determine and/or define which of the directional radiances are shared amongst the interactions in the ray caster 104 tracing rays (e.g., for path guiding). In some embodiments the lighting reprojector 110 may be used by the lighting determiner 106 to reproject directional radiances of light transport paths in computing the data representative of the lighting conditions.

Figure 2:
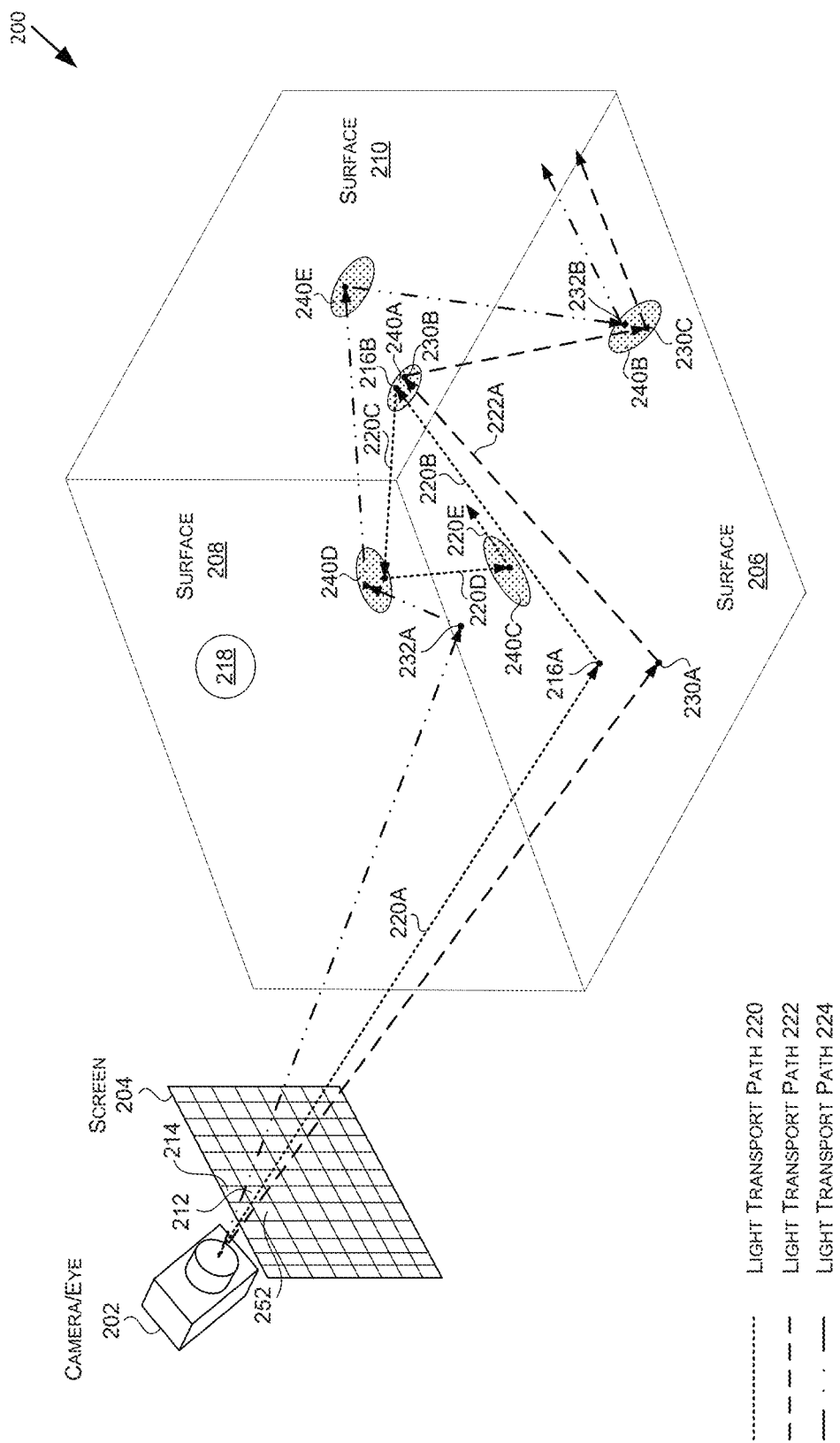
FIG. 2 is a diagram illustrating an example of spatially sharing directional radiances of light transport paths, in accordance with some embodiments of the present disclosure.

FIG. 1 shows a rendering progression of an image 114 to an image 116, which may correspond to render data generated by the image renderer 102 in rendering a state of a virtual environment, such as the virtual environment 200 of FIG. 2. While the image renderer 102 may be described as rendering the image 114 and the image 116, the various examples described herein are not limited to rendering the image 114 or the image 116. For example, the image 114 and the image 116 need not be fully rendered as shown, but may more generally indicate the lighting condition data at different stages of rendering a final output image. As an example, one or more portions of visual content of the image 114, the image 116, and/or components thereof may be rendered (e.g., radiance) at those stages, and further processing may be performed to produce the final output image.

The image 114 is shown to illustrate a state of the lighting condition data prior to or without using the lighting reprojector 110 for directional radiance reprojection. The example shown corresponds to a rendering performed by the image renderer 102 at 1 sample per-pixel using path tracing that incorporates shared directional radiance data, in accordance with disclosed embodiments. While the lighting condition data may include noise, the noise is significantly lower than rendering at 1 sample per-pixel using conventional path tracing. The image 116 is shown to illustrate a state of the lighting condition data after using the lighting reprojector 110 for directional radiance reprojection. While the noise may still be noticeable, the noise is less noticeable than in the image 114. The noise may be further mitigated—in some embodiments—by additionally processing the lighting condition data of the image 116, such as using spatial and/or temporal denoising filters applied to the lighting condition data that corresponds to the image 116. In some embodiments, the lighting reprojector 110 may not be included in the rendering system 100 or may not be used to render an output image. In such embodiments, the additional processing, such as using the spatial and/or temporal denoising filters may still be applied, for example, to the lighting condition data of the image 114.

The image renderer 102 may render the lighting condition data of the image 114 and the image 116 (and/or portions or components thereof) using any suitable approach that uses rays to sample lighting conditions of a virtual environment (e.g., to generate solutions to the rendering equation for pixels and/or light transport paths). Thus, while examples herein may be described with respect to path tracing and similar approaches, the present disclosure is contemplated as being more widely applicable.

Referring now to FIG. 2, FIG. 2 is a diagram illustrating an example of spatially sharing directional radiances of light transport paths, in accordance with some embodiments of the present disclosure. FIG. 2 shows the virtual environment 200 including a camera 202, a screen 204, and surfaces 206, 208, and 210. The camera 202 may be a virtual camera, such as a viewpoint camera, and may represent a perspective of a viewer of the virtual environment 200 to be rendered by the image renderer 102. The screen 204 may be a virtual representation of a screen which may or more not be the same resolution as the image 114, the image 116, and/or other images generated in the rendering pipeline (e.g., the resolution may be converted, translated, or cropped). The screen 204 may include a matrix of virtual pixels or regions, of which a pixel 212, a pixel 214, and a pixel 252 are individually labeled.

The image renderer 102 may use a similar or different approach to determining lighting condition data for each pixel of the screen 204 (e.g., path tracing), an example of which is described with respect to the pixel 212 and a light transport path 220. For example, a similar or different approach may be used for the pixel 214 that involves a light transport path 222 and/or the pixel 252 that involves a light transport path 224. To determine at least some lighting condition data for the pixel 212 (e.g., corresponding to a pixel of the image 114 and/or the image 116 of FIG. 1), the image renderer 102 may use the ray caster 104 to determine one or more ray-traced light transport paths through the virtual environment 200. The light transport path 220 is an example of one of the ray-traced light transport paths for the pixel 212. In embodiments that only use one sample per-pixel to render the state of the virtual environment 200, such as to generate the image 114 or the image 116, the light transport path 220 may be the only path cast against the state and/or used to compute the lighting condition data for the pixel 212. In other cases, any number of light transport paths may be cast for a pixel and combined (e.g., using shared lighting condition data as described herein) to determine the lighting condition data.

The light transport path(s) may be used to sample lighting conditions for the pixel 212. To do so, the ray caster 104 may cast any number of rays (e.g., one or more)—such as a ray 220A of the light transport path 220—through the pixel 212 of the screen 204 to sample lighting conditions for the pixel 212. These rays may be referred to as camera rays, eye rays, incident rays, view vectors, or primary rays, as examples. The ray caster 104 may use the camera rays to determine visible points in the virtual environment 200. For example, the ray caster 104 may use the ray 220A to determine a point 216A on or near the surface 208. This may include the ray caster 104 determining the point 216A as the location where the ray 220A interacts (e.g., intersects) with the surface 208 (or the point 216A may otherwise be based at least in part on that location). Although the ray 202A interacts with the surface 208, in examples where more than one ray is cast, not all rays may interact with a surface.

From each point in the virtual environment 200 that the image renderer 102 determines using a ray cast through the pixel 212, any number of rays (e.g., one or more)—such as a ray 220B—may be cast to sample radiance (e.g., directional radiance(s)) at the point 216A. The image renderer 102 may determine the direction of the ray 220B using a stochastic sampling strategy such as a Monte Carlo or a quasi-Monte Carlo sampling strategy. In some examples, the sampling strategy and direction are based at least in part on a normal of the surface 208 at the point 216A. For example, the ray caster 104 may define a Normal Distribution Function (NDF) range for the point 216A based at least in part on the normal of the surface 208 at the point 216A.

The ray caster 104 may use the NDF and the ray 220A (and in some examples a roughness value of the surface 208 that is associated with the point 216A) to define a Bidirectional Reflectance Distribution Function (BRDF). The ray caster 104 may sample the BRDF lobe 230 (e.g., stochastically using the BRDF or using another sampling strategy) to determine the ray 220B. The ray caster 104 may use the ray 220B to determine a point 216B on or near the surface 210. Similar to the point 216A, this may include the ray caster 104 determining the point 216B as the location where the ray 220B interacts (e.g., intersects) with the surface 210. Although the ray 220B interacts with the surface 210 in FIG. 2, in examples where more than one ray is cast, not all rays may interact with the surface 210. For example, a ray may interact with a different surface or object, may not interact with any surface or object, or may interact with a light source, such as a light source 218.

The ray caster 104 may, similar to the interaction at the 216A, cast any number of rays (e.g., one or more)—such as a ray 220C—from the point 216B to sample radiance (e.g., directional radiance(s)) at the point 216B (e.g., using stochastic sampling). This process may continue for each interaction, until the light transport path 220 is formed. Rays of a light transport path other than the primary ray, may be referred to as reflected rays, or secondary rays, as examples. In the light transport path 220, the ray 220B, the ray 220C, a ray 220D, and a ray 220E are examples of secondary rays. Generally, a light transport path may include any number of secondary rays. Further, a light transport path may generally include an interaction with a light source, such as the light source 218 (e.g., at an end point of the light transport path). For example, each of the light transport paths 220, 222, and 224 may interact with a light source(s), such as the light source 218. In such examples, the light transport paths 220, 222, and 224 may include one or more additional secondary rays (not shown) to reach the light source 218.

In at least one embodiment, one or more light transport paths may be used by the lighting determiner 106 to determine ray-traced samples of lighting conditions for the pixel 212. For example, the lighting determiner 106 may determine at least some lighting condition data for the pixel 212 by combining (e.g., averaging) the directional radiance data derived from the various interactions with the virtual environment 200. The lighting determiner 106 may similarly determine at least some lighting condition data for each pixel or region of the screen 204 (e.g., using any number of primary rays and secondary rays). For example, the lighting determiner 106 may compute the lighting condition data for a pixel by applying the directional radiance data from any number of interactions along a light transport path to the rendering equation.

In various examples, the image renderer 102 uses the ray caster 104 to implement path tracing to determine the lighting condition data. Using path tracing, the ray caster 104 may generate light transport paths (e.g., a chain of rays) from visible surface points to a light source(s). In generating a light transport path (e.g., the light transport path 220), rays may be traced recursively until hitting a light source (e.g., the light source 218). The lighting determiner 106 may recursively evaluate the rendering equation along each light transport path (e.g., at the interactions, or points thereof). Ray generation may be governed by the light source(s) and BRDFs. Recursion depth may be governed, for example, by the amount of radiance computed along a ray.

Using a path tracing approach for the light transport path 220, as an example, for the pixel 212, the ray 220A may be cast through the pixel 212. At the point 216A, the lighting determiner 106 may evaluate the rendering equation using Monte Carlo integration or another integration based sampling technique. To approximate the radiance, one or more secondary rays, such as the ray 220B may be traced into a random or pseudo-randomly selected sample direction. For example, a sample direction may be determined based at least in part on a BRDF, one or more light sources, and/or cosine weighting of the incoming radiance. This approach may be recursively applied, for example, as long as it is determined there is a threshold amount of radiance transported along a ray. Recursion may stop for any of a variety of possible reasons, such as if a light source is hit, a maximum depth/minimum radiance is reached, the ray leaves the scene/hits the background, etc.

In at least one embodiment, one or more light transport paths may be used by the ray caster 104 to determine one or more rays of at least one light transport path. For example, the ray caster 104 may determine at least some shared directional radiance data used to generate one or more rays of the light transport path 220 by combining (e.g., averaging) directional radiance data derived from the various interactions with the virtual environment 200. As an example, the ray caster 104 may use shared incoming radiance for path guiding at any of the various points, or vertices, along the light transport path 220 in order to cast one or more rays of the light transport path 220. As an example, one or more secondary rays, such as the ray 220B may be traced into a random or pseudo-randomly selected sample direction, which may be controlled, at least in part, by shared directional radiance. For example, a sample direction may be determined based at least in part on a BRDF (e.g., within shared directional radiance or local), one or more light sources, and/or cosine weighting of the shared incoming radiance. The ray caster 104 may similarly determine at least some shared directional radiance for each light transport path used to generate the image 114.

The image renderer 102 may use the lighting condition data for each pixel to render one or more corresponding pixels of the images 114 and/or 116. Generally, the accuracy of the lighting conditions that the lighting determiner 106 computes for a pixel with respect to a light source(s) may increase with the number of primary and/or secondary rays used to sample the lighting conditions. However, the computing resources used to determine the lighting conditions also may increase with the number of rays, which may increase render times.

To preserve computing resources and to reduce render times, the number of rays used to sample lighting conditions may be below what is needed for rendering quality to converge to an ideal ray-traced result. This may result in the lighting determiner 106 generating noisy lighting condition data, as indicated in the image 114. The image 114 is an example in which the lighting conditions of each pixel of the screen 204 is based on a single ray-traced sample of a state of the virtual environment 200 (e.g., comprising a single primary ray and a single secondary ray per incident ray). The noisy lighting condition data may be further processed to reduce or eliminate the noise and provide a high quality rendered image. In contrast, generating the image 114 using a conventional approach to path tracing that employs a single ray-traced sample of the state of the virtual environment 200 for each pixel would result in significantly more noise in the lighting condition data, and render quality that is too low for most use cases (with noticeable noise or visual artifacts). As such, conventional approaches typically require hundreds of samples or more for each pixel.

In accordance with aspects of the present disclosure, the number of samples needed by the image renderer 102 to accurately render global illumination for a virtual environment may be reduced, for example, by combing directional radiance data from different interactions of rays (e.g., of one or more light transport paths) and applying that shared information to ray tracing. For example, rather than only leveraging the directional radiance data directly attributable to an interaction, the lighting determiner 106 and/or the ray caster 104 may compute aggregate directional radiance for the interaction that is a combination of directional radiances (e.g., a statistical combination such as an average) based on at least one other interaction that corresponds to a different ray. This approach may be used to increase the effective sample count at one or more of the interactions. For example, another interaction may be sufficiently similar to the interaction so that the directional radiance data for that interaction may serve as an approximation of a sample for the other interaction.

Figure 3:
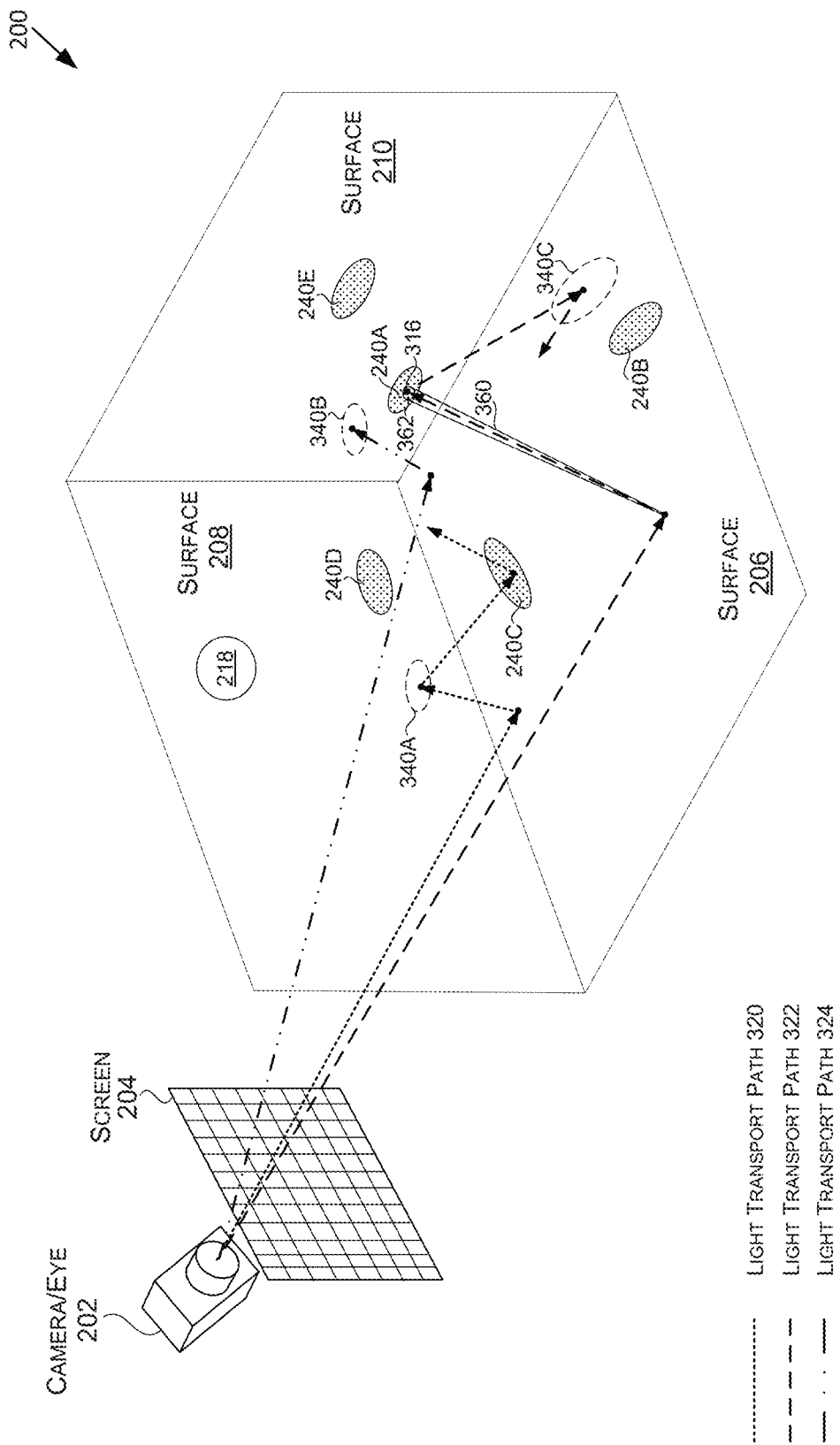
FIG. 3 is a diagram illustrating an example of temporally sharing directional radiances of light transport paths, in accordance with some embodiments of the present disclosure.

In various examples, the directional radiances of light transport paths may be shared between interactions spatially and/or temporally. FIG. 2 is used primarily to describe spatially sharing the directional radiances, whereas FIG. 3 is used primarily to describe examples of temporally sharing the directional radiances (in addition to or instead of spatial sharing). Spatially sharing directional radiance data may refer to sharing directional radiance data that corresponds to a common time and/or state of the virtual environment to determine lighting condition data for that time and/or state. Temporally sharing directional radiance data may refer to sharing directional radiance data that corresponds to different times and/or states of the virtual environment to determine lighting condition data for a time and/or state of the virtual environment (e.g., from one or more previous states and/or frames). For example, each state may be associated with a respective time and a respective rendering configuration of the virtual environment. The time may refer to a time in the render sequence and/or a playback sequence of a game, video, and/or rendered frames. The rendering configuration may refer to a set of render properties of objects (e.g., all visible objects) in the virtual environment that impact spatial rendering of the virtual environment. For example, two states may have the same rendering configuration when the render properties are the same for each state.

FIG. 2 shows examples of interactions for which the lighting determiner 106 may spatially share directional radiance data to compute aggregate directional radiance data for at least one interaction. As shown, the virtual environment includes regions 240B, 240B, 240C, 240D, and 240E which each may correspond to a region of the virtual environment 200 (e.g., a surface region). Directional radiance data samples for the interactions that are shown as falling within the same region may be combined with one another to compute aggregate directional radiance data for one to all of the interactions in computing lighting condition data for a corresponding light transport path. For example, directional radiance data for the interaction for the point 216B of the light transport path 220 may be combined with directional radiance data for the interaction for the point 230B of the light transport path 222 which may be used to compute lighting condition data for the light transport path 222 and/or the light transport path 220 (e.g., at the pixels of the screen 204). Although the example shares directional radiance data between two interactions and two light transport paths, any number of interactions may be shared that correspond to any number of light transport paths.

As indicated in FIG. 2, interactions may share directional radiance data that have the same bounce number in their corresponding light transport paths, or different bounce numbers. For example, the points 216B and 230B both correspond to a second bounce of the light transport paths 220 and 222 respectively. However, the region 240B includes a point 230C that corresponds to a third bounce of the light transport path 222 and a point 232B that correspond to a fourth bounce of the light transport path 224.

Referring now to FIG. 3, FIG. 3 is a diagram illustrating an example of temporally sharing directional radiances of light transport paths, in accordance with some embodiments of the present disclosure. FIG. 3 is used to describe examples of interactions for which the lighting determiner 106 may temporally share directional radiance data to compute aggregate directional radiance data for an interaction. FIG. 3 may correspond to a subsequent state and/or time of the virtual environment 200 relative to the virtual environment 200. For example, FIG. 3 may correspond to a frame that the image renderer 102 renders after (e.g., immediately after) a frame corresponding to FIG. 2. The image renderer 102 may render the state similar to the state of FIG. 2, which may include generating any number of light transport paths, such as a light transport path 320, a light transport path 322, and a light transport path 324. The light transport paths 320, 322, or 324 may correspond to the same or different pixels as the light transport paths 220, 222, or 224.

In rendering the virtual environment 200, directional radiance data for the interactions for the points along light transport paths that are shown as falling within the same region in FIGS. 2 and 3 may be combined with one another to compute aggregate directional radiance data for one to all of the interactions to compute lighting condition data for a corresponding light transport path. For example, directional radiance data for the interaction for the point 316 of the light transport path 320 of FIG. 3 may be combined with directional radiance data for the interaction for the point 216B of the light transport path 220 of FIG. 2 and/or the interaction for the point 230B of the light transport path 222, which may be used to compute lighting condition data for the light transport path 322. Although the example shares directional radiance data between three interactions and three light transport paths, any number of interactions may be temporally shared that correspond to any number of light transport paths. The aggregate or shared lighting condition data may additionally be computed from one or more spatially shared samples of FIG. 3, similar to FIG. 2.

FIG. 3 also shows regions 340A, 340B, and 340C, which may be similar to the regions 240A, 240B, 240C, 240D, and 240E. However, the regions 340A, 340B, and 340C are not shown in FIG. 2 to indicate that interactions of FIG. 3 within those regions may not temporally share samples with interactions from the light transport paths 220, 222, and 224 of FIG. 2. However, those interactions of FIG. 3 may temporally share samples with interactions from other light transport paths not shown in FIG. 2. Also, an interaction may use one or more samples from any number of preceding states and/or frames of the virtual environment 200, which may or may not be consecutive states and/or frames. Similar to leveraging spatial samples, leveraging temporal samples may increase the effective sample count at each interaction that is used to compute lighting condition data for pixels. Determining whether to share directional radiance data between temporally different interactions (and/or how much to weight different directional radiances when combining them), the characteristics may also be based on an amount of motion between the states of the virtual environment and/or amount of time or frames between the states.

To ensure the directional radiance(s) that is shared with an interaction is relevant to the interaction (e.g., sufficiently similar to the interaction so that the directional radiance data for that interaction is an approximation of a sample for the other interaction), the directional radiance manager 108 may base the sharing on similarities between characteristics of the interactions. As an example, directional radiances for different interactions may be shared based on the relative locations of the corresponding surface points of the interactions. For example, directional radiances for interactions within a defined region of the virtual environment may be shared. In FIGS. 2 and 3, these defined regions may correspond to the regions 240A, 240B, 240C, 240D, and 240E of FIG. 2 and the regions 340A, 340B, and 340C of FIG. 3. In some embodiments, interactions within the same region may be shared, whereas interactions that are not within the same region are not shared. However, in some examples, interactions within the same region may not be shared based on other factors, or the region may not be based on relative interaction locations.

The directional radiance manager 108 may determine and/or define the regions using various approaches. In some examples, the region may be defined by a texel of a texture map (e.g., a lightmap) used to render the virtual environment 200. Interactions that are within a region of the texel may be accumulated to the texel and to compute the aggregate directional radiance. For example, the size and/or shape of the region 240A may correspond to a texel and each of the interactions associated with the points 230B, 216B, and 316 may be within the texel and therefore share lighting condition data (the weightings of those samples may be based on one or more of the characteristics described herein).

Other examples of characteristics that may be used to define and/or determine whether directional radiances of interactions are shared may be based on radiance direction associated with incoming and/or outgoing rays of the interactions, the hit distance associated with the incident rays of the interactions, the length of the light transport paths up to the interactions, the number of bounces up to the interactions, and/or areas of path footprint approximations that correspond to the incident rays. When values of one or more of those characteristics are within one or more threshold values of one another, the lighting conditions of the corresponding interactions may be shared.

As an example, the directional radiances for the points 216B, 230B, and/or 316 may be shared based on the areas of the corresponding path footprint approximations for the secondary rays 220B and 222A at the corresponding points 216B and 230B being of a similar size (e.g., within a threshold size of one another). For example, FIG. 3 shows a path footprint approximation 360 for the interaction at the point 316 having an area 362. Various approaches may be used for determining the path footprint approximation, such as path perturbation approaches or ray differentials. The areas for the points 216B and 230B may be similar to the area 362 (e.g., within a threshold amount), resulting in the directional radiances being shared. However, directional radiance data for another point that falls within the region 240A may not be shared with the points 216B, 230B, or 316 based on the path footprint approximations of the associated incident ray being sufficiently smaller or larger than the path footprint approximations for the points 216B, 230B, or 316 (e.g., having an area outside of a threshold range).

In any suitable example, the directional radiance data that is shared between interactions of a scene may form a discretized finite-element solution to the rendering equation, which may be represented as a solution vector B at frame t. At frame t+1 the lighting determiner 106 may compute a new solution vector B'=TB+E where E is the emission of the various surface elements, and T is the usual transport operator. In some examples, E may be embedded, at least partially, in the solution vector B. In various embodiments, the lighting determiner 106 may compute the solution vector for a frame by sampling paths starting from the camera 202, and by the ray caster 104 scattering them at each interaction with the virtual environment 200—as performed in regular path tracing. However, unlike in regular path-tracing, the directional radiance manager 108 may use each scattering event to update a local cache entry (e.g., a hash cell, a texel of a texture map, etc.) at the surface hit point (e.g., the point 216B, 230B, etc.), treating the new scattered particle as a single sample unbiased estimator of the local transport operator T. Hence, if the ith vertex along the light transport path 220 hits the region 240A, and the vertex i+1 hits the region 240D, essentially, the lighting determiner 106 may treat the segment between them as a sample of the form factor F_pq between the two surface elements (p, q), and the ray caster 104 may update B'_p using the previous frame solution B_q.

Using this approach, the lighting determiner 106 may use the light transport solver to smooth the solution both in space (across the fine element's extents) and in time (reusing information from one or more previous frames). The light transport solver may, for example, include a Jacobi radiosity solver and may use a screen-space path sampler (e.g., a screen-space path sampler Monto Carlo) to update the solution at each frame, while reusing the solution from one or more previous frames. In order to limit the temporal extent, the lighting determiner 106 may average the new solution vector with the previous vector using a modified exponential average method or other algorithm (e.g., a moving average algorithm). As described herein, in some embodiments, weighted averaging may be used that is a hybrid between linear accumulation and exponential weighting.

In various examples, one or more of the characteristics may define a size of a defined region of the virtual environment in which the directional radiances for interactions may be shared. For example, the radiance direction associated with incoming and/or outgoing rays of the interactions, the hit distance associated with the incident secondary rays of the interactions, the length of the light transport paths up to the interactions, the number of bounces up to the interactions, and/or areas of path footprint approximations that correspond to the incident secondary rays may be used to select and or compute the size of the defined region. By basing the size of the region used to share directional radiances on the characteristics, the regions may be larger for interactions where a coarser approximation of a directional radiance is appropriate, such as to account for increased blur the farther an interaction is from the viewpoint camera.

For example, the size of the region that defines what is shared with an interaction may increase as a function of one or more of the radiance direction associated with incoming and/or outgoing rays of the interactions, the hit distance associated with the incident secondary ray of the interaction, the length of the light transport path up to the interaction, the number of bounces up to the interaction, and/or the area of a path footprint approximation that corresponds to the incident secondary ray.

In examples where the texture map is implemented as a mipmap, the size may be defined by the directional radiance manager 108 selecting a level in the mipmap based on the one or more characteristics, and the texel at the selected level. The system may for each interaction select a level, and directional radiances of interactions with that selected level may have shared directional radiances where they each correspond to the texel at that level. The level the directional radiance manager 108 selects may define the size and/or shape of the region that defines what interactions may share directional radiance data. Further, the directional radiance manager 108 may select a level for each interaction. This selection may be based on any of the examples described herein using any of the various interaction characteristics (e.g., path footprint area, hit distance, number of bounces, etc.). For example, the directional radiance manager 108 may share directional radiance data between interactions when the directional radiance manager 108 both selects the same level for the interactions and the interactions fall within the same texel of that level.

Figure 4:
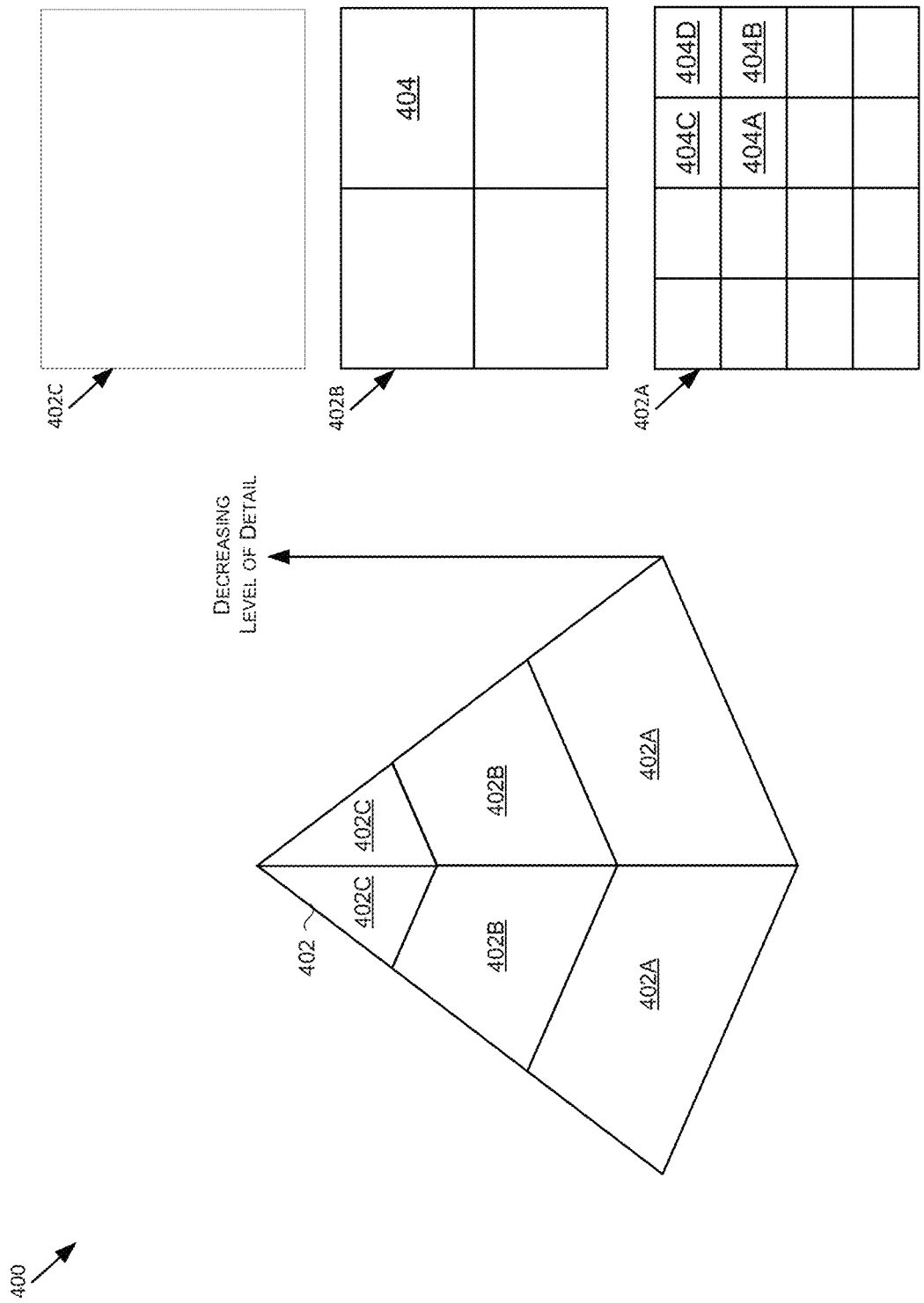
FIG. 4 is a diagram illustrating an example of a mipmap and texels which may be used to define a region of shared lighting conditions, in accordance with some embodiments of the present disclosure.

Referring now to FIG. 4, FIG. 4 is a diagram illustrating an example of a mipmap 400 and texels which may be used to define a region of shared directional radiances, in accordance with some embodiments of the present disclosure. The mipmap 400 is illustrated using a pyramid 402 which may represent levels 402A, 402B, and 402C of progressively lower resolution representations of the same image. Although FIG. 4 shows three levels, the mipmap 400 may include any number of levels. Also, in some examples, a mipmap may not be used, but the texels of a texture map may be used similar to the texels of the mipmap (e.g., as described above).

As shown, each level 402A, 402B, and 402C includes a number of texels with higher resolution levels having more and smaller texels, which may be arranged in a grid-like pattern. In various embodiments, a region used to share directional radiance data may be defined at least partially by one or more of the texels. For example, each texel may correspond to a defined region. As an example, the region 240A of FIG. 2 may be defined by the texel 404 of FIG. 4 and have a size and/or shape that is the same as the texel 404 or otherwise based on the size and/or shape of the texel 404. Thus, the locations of the points 216B and 230B in FIG. 2 may fall within the texel 404. In some examples, when the ray caster 104 determines an interaction, the directional radiance manager 108 may determine the texel corresponding to the interaction and store the directional radiance data for that interaction to the texel. Similarly, the directional radiance data for other interactions may be stored to the texel. For example, the directional radiance data from different interactions may be accumulated to the texel, such as by computing and storing the combined directional radiance data to the texel.

In some embodiments, the directional radiance manager 108 selects a texel for an interaction based at least on part on one or more characteristics of the interaction. For example, the directional radiance manager 108 may select the level of the mipmap based on the one or more characteristics and use the texel that the interaction falls within at that level to define the region for the interaction. If the directional radiance manager 108 selects the level 402A for an interaction, the directional radiance manager 108 may select the texel 404A of that level if the interaction falls within the texel 404A. However, if the directional radiance manager 108 instead selects the level 402B for the interaction, the directional radiance manager 108 may select a texel 404, which covers locations of the texel 404A, a texel 404B, a texel 404C, and a texel 404D in the level 402A.

Thus, the texel 404 may be larger and account for additional samples based on the characteristics of the interaction. Examples of characteristics that may be used to define the size of the region (e.g., to select the level of the mipmap 400) include one or more of the hit distance associated with the incident secondary ray of the interaction, the length of the light transport path up to the interaction, the number of bounces up to the interaction, and/or an area of a path footprint approximation that corresponds to the incident secondary ray. When values of one or more of those characteristics are within one or more threshold values of one another (e.g., within the same threshold range), the directional radiances of corresponding interactions may be shared. For example, the level of the mipmap used to define the region of what is shared with an interaction may increase and decrease as a function of one or more of the radiance direction associated with incoming and/or outgoing rays of the interactions, the hit distance associated with the incident secondary ray of the interaction, the length of the light transport path up to the interaction, the number of bounces up to the interaction, and/or the area of a path footprint approximation that corresponds to the incident secondary ray.

To share directional radiance data between interactions, the directional radiance manager 108 may store the directional radiance data in a cache. For example, when the ray caster 104 determines an interaction, the directional radiance manager 108 may determine the corresponding cache of directional radiance data for that interaction and store and/or update the directional radiance data. For example, the cache may be a radiance cache that stores directional radiance data. Any number of caches may be used and may correspond to the regions and/or finite elements, with which directional radiance data is shared between interactions. In some embodiments, each region or finite element may have a corresponding cache. In the example of a region corresponding to a texel, the cache may include or correspond to the texel, such as described above. The texel is an example of a local data store, or cache, for an interaction, as it corresponds to the location of the interaction in a virtual environment.

In embodiments, a spatial hashing scheme may be used to store directional radiance data to an appropriate cache, which may also be referred to as a hash cell when described in connection with a spatial hashing scheme. The spatial hashing scheme may employ any number of dimensions in one or more hash functions, which may, for example, correspond to any of the various factors or characteristics described herein for sharing directional radiance data, such as an outgoing direction at a vertex for outgoing radiance data and/or an incoming direction for incoming radiance data a vertex. For example, the spatial hashing scheme may operate similar to the texture map(s) described herein, with directional radiance data being stored in hash cells as opposed to texels of a texture map. In embodiments where regions correspond to finite elements, the spatial hashing scheme may form a hierarchy of finite elements.

In some examples, these dimensions (or characteristics) may include or be based on any of the various variables (e.g., of a basis function) used to encode a corresponding light field. Using disclosed approaches, basis functions may essentially be the product of a grid discretization of the spatial component and another grid discretization of the directional component.

In order to account for normal variation within each hash cell, a low-order spherical harmonics representation may be used to encode directional radiance data—such as multiple bands (e.g., two) representing luminance in a YCoCg color decomposition. The YCoCg spherical harmonics representation may allow for recapture of detail due to normal variation in each hash cell. In some embodiments, incoming directional radiance and outgoing directional radiance may be stored in the same cache. In other examples, incoming directional radiance and outgoing directional radiance may be stored in separate caches (e.g., using different characteristics or dimensions). Separate caches may be more practical for some disclosed embodiments that leverage directional radiance for importance sampling.

In various embodiments, spatial hashing for the 3D spatial component and the 2D outgoing direction may be combined with any of a variety of dense representations for the 2D incoming direction domain, such as regular grids, k-d trees, or spherical Gaussian mixture models. While regular grids represent an orthonormal basis, making their update straightforward (even on parallel architectures), k-d trees and spherical Gaussians do not represent an orthonormal basis, and may require custom update methods. For spherical Gaussians, a parallel adaptation of a stepwise-EM algorithm may be employed as an update method. For k-d trees, an update method may be employed that keeps a k-d tree with a fixed number of leaves for each spatial cell, and efficiently adapts both the topology of the tree and the probabilities assigned to its leaves using statistics collected during each frame. Sampling from the k-d tree may be performed using hierarchical sample warping.

As described herein, aspects of the disclosure provide for building all-frequency approximations to the light transport distribution into a scene by filtering individual samples produced by an underlying path sampler (e.g., implemented by the ray caster 104) using online iterative algorithms and data-structures that exploit the spatial and/or temporal coherence of the approximated light field that corresponds to shared directional radiance. An iterative temporal feedback loop may be used to improve convergence to a noise-free approximant, along with a representation that allows the encoding of directional variations, such as those due to glossy reflections. Further the resulting approximations may be used by the ray caster 104 to control underlying path sampling and/or to modify an associated estimator. For example, using disclosed approaches, the variance of an estimator used by the ray caster 104 may be low while being robust to complex lighting scenarios.

As described herein, disclosed embodiments may reuse samples generated by path sampling to build finite element approximations of light fields. Some examples of how the lighting determiner 106 and/or the ray caster 104 may encode and/or use shared directional radiance data to compute lighting condition data for pixels are described by way of example only, and other suitable approaches may be used.

A light field may describe the amount of light flowing in every direction through every point in space and may be discretized as a 5-dimensional (5D) light field:

$$\mathcal{H} = \{b_h : h \in \{1, \ldots, N\} \times \{1, \ldots, M\}\} \quad \text{Equation (1)}$$

In accordance with at least one embodiment, the ray caster 104 may include a finite element solver for the rendering equation constructed using the discretization H as a basis. For example, the solution of the discretized rendering equation may be viewed as the solution of:

$$L_0 = TL_0 + L_e \quad \text{Equation (2)}$$

$$\tilde{L}_0 = \langle L_0, b_h \rangle \quad \text{Equation (3)}$$

where T is the transport operator, $L_0$ is total spectral radiance, $L_e$ is emitted spectral radiance, $b_h$ is a basis function, and $\langle, \rangle$ denotes projection on the basis functions. A path tracing based solver of the ray caster 104 may therefore be based on the discretized equation by finite element approximation. For example, sample paths obtained by a regular path sampler of the ray caster 104 can be used to estimate the projection over the outgoing light field on a finite element basis, in which each vertex along a path touches a finite element.

In accordance with some aspects of the disclosure, each path generated by the ray caster 104 may touch as many finite elements as it has vertices. As such, each sample path may be used by the ray caster 104 and the directional radiance manager 108 to update all the finite elements it lands upon.

Aspects of the disclosure may assume there can be several path sampling techniques employed by the ray caster 104, each associated with a sampling probability p and a corresponding multiple importance sampling weight w (the dependence on the technique is omitted for improved readability). Given a sample path x with n+1 vertices $x = x_0 x_2 \ldots x_n$, and assuming its probability and multiple importance sampling weight decompose into products of the form:

$$p(x) = p(x_0) \cdot p(x_1 | x_0) \ldots p(x_n | x_{n-1}) \quad \text{Equation (4)}$$

$$w(x) = w(x_0) \cdot w(x_1 51\ x_0) \ldots w(x_n | x_{n-1}) \quad \text{Equation (5)}$$

then the solution at the finite elements touched by vertex $x_i$ may be updated by the directional radiance manager 108 using an unbiased estimator of the ray caster 104 provided by the tail of the path $x_i \ldots x_n$.

The outgoing radiance of vertex xi having an outgoing direction $\varepsilon_i^o$ may then be denoted as:

$$\tilde{L}_o(x_i, \omega_i^o) = L_e(x_i, \omega_i^o) + \sum_{j > i} L_e(x_i, \omega_i^o) \prod_k^{i \le k \le j} f_k(\omega_k^i, \omega_k^o) G(x_k, x_{k+1}) \frac{w(x_{k+1} | x_k)}{p(x_{k+1} | x_k)}, \quad \text{Equation (6)}$$

where G denotes the geometric throughout between two vertices, $f_k$ denotes the bidirectional scattering distribution function at vertex k, and $\varepsilon_k^i$ and $\varepsilon_k^o$ denote the incoming and outgoing directions at vertex k.

As such, a single-sample unbiased estimator of the approximation of Equation (3) that is implemented by the ray caster 104 may be obtained as:

$$\tilde{L}_{o,h} \approx \tilde{L}_o(x_i, \omega_i^o) b_h(x_i, \omega_i^o) \cdot \frac{w(x_o) \ldots w(x_i | x_{i-1})}{P_T(x_i, \omega_i^o)} \quad \text{Equation (7)}$$

where $P_T(x_i, \varepsilon_i^o)$ is the total throughput measure probability of the ray caster 104 sampling a path which lands on the vertex $x_i$ from outgoing direction $\varepsilon_i^o$. This factor is itself a marginal probability, whose computation may involve integrating over all of path space. To avoid this, in some embodiments of the disclosure the ray caster 104 may use a biased density estimator by shooting N paths $x_p$, with $p \varepsilon 1, \ldots N$ and keeping track of a weighted sum of the number of vertices $c_h$ that fall on each basis function $b_h$:

$$C_h = \sum_{p=1}^N \sum_i b_h(x_{p,i}, \varepsilon_{p,i}^o) \cdot w(x_{p,i} | x_{p,i-1}) \quad \text{Equation (8)}$$

and use $$\tilde{L}_{o,h} \approx \sum_{p=1}^N \tilde{L}_o(x_{p,i}, \omega_{p,i}^o) \frac{b_h(x_{p,i}, \omega_{p,i}^o) w(x_{p,i} | x_{p,i-1})}{c_h} \quad \text{Equation (9)}$$

as an estimator of the approximation of Equation (3). Using this approach, in accordance with some embodiments of the disclosure, an approximation of the light field may be updated by the directional radiance manager 108 at all path vertices x, using arbitrary basis function $b_h$ that may span both the spatial and the directional domain (and using multiple importance sampling in some examples). If the spatial and angular support of the basis functions is small, and variations may be neglected inside the support, the biased density estimator may only be slightly biased.

Figure 5:
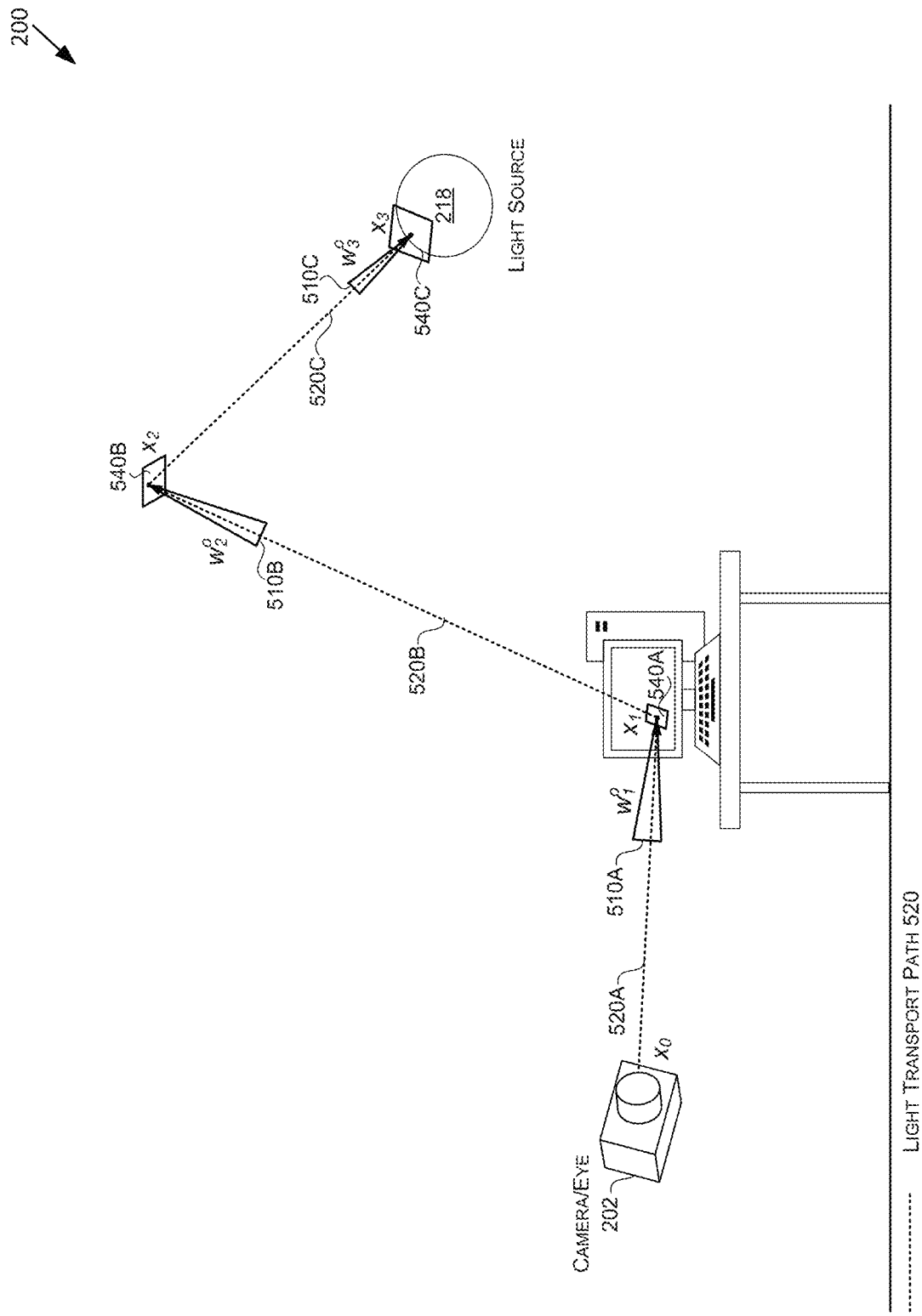
FIG. 5 is a diagram illustrating an example of a light transport path having finite elements at vertices that may be used to form a discretized finite-element solution to the rendering equation, in accordance with disclosed embodiments.

Referring to FIG. 5, FIG. 5 is a diagram illustrating an example of a light transport path having finite elements at vertices that may be used to form a discretized finite-element solution to the rendering equation, in accordance with disclosed embodiments. In particular, a light transport path 520 includes vertices $x_1$, $x_2$, and $x_3$, at corresponding interactions of the light transport path 520 in the virtual environment 200. The light transport path 520 may be similar to other light transport paths described herein, and starts at the camera 202 and ends at the light source 218.

Each vertex in the light transport path 520 touches a finite element. For example, the vertex $x_1$ touches a finite element 540A, the vertex $x_2$ touches a finite element 540B, and the vertex $x_3$ touches a finite element 540B. As described herein, each of the finite elements 540A, 540B, and 540C may correspond to a respective region in which directional radiance may be shared spatially and/or temporally between one or more light transport paths cast in the virtual environment 200 (e.g., as described with respect to FIGS. 2-4).

In embodiments, to sample the light transport path 520, a ray 520A may be cast in the virtual environment 200. Based on an interaction at the vertex $x_1$, the direction $\varepsilon_1^o$ of the radiance associated with the ray 520A and/or other factors or characteristics described herein (e.g., using path a footprint approximation to select an appropriate mipmap and/or resolution level) may be used to determine the finite element 540A (e.g., from a cache). The finite element 540A may include data representative of an outgoing radiance field 510A, which may be used to cast a ray 520B. Based on an interaction at the vertex $x_2$, the direction $\varepsilon_2^o$ of the radiance associated with the ray 520B and/or other factors described herein may be used to determine the finite element 540B (e.g., from a cache).

The finite element 540B may include data representative of an outgoing radiance field 510B. The outgoing radiance field 510B may be used to update the data representative of the outgoing radiance field 510A in the finite element 540A. The outgoing radiance field 510B may also be used to cast a ray 520C. Based on an interaction at the vertex $x_3$, the direction $\varepsilon_3^o$ of the radiance associated with the ray 520C and/or other factors described herein may be used to determine the finite element 540C (e.g., from a cache). The finite element 540C may include data representative of an outgoing radiance field 510C. The outgoing radiance field 510C may be used to update the data representative of the outgoing radiance field 510B in the finite element 540B.

Any number of light transport paths may be cast into the virtual environment 200 (e.g., one per-pixel per-frame), similar to the light transport path 520, and finite elements may be determined and updated in a similar manner (e.g., each frame).

Examples of Progressive Solvers

Faster convergence may be obtained by the ray caster 104 using a progressive solver of the rendering equation. The solution to the rendering equation may be written using as:

$$L_o = L_e + TL_e + T^2 L_e + T^3 L_e + \ldots \quad \text{Equation (10)}$$

where the equilibrium radiance distribution is the sum of emitted radiance transported once, twice, three times, and so on depending upon the number of vertices in a path. The estimator may be redefined as:

$$\tilde{L}_{o,h}^{new} \approx \sum_{p=1}^{N} \tilde{L}_o^{new}(x_{p,i}, \omega_{p,i}^o) \frac{b_h(x_{p,i}, \omega_{p,i}^o) w(x_{p,i} \mid x_{p,i-1})}{c_h} \quad \text{Equation (11)}$$

and, in accordance with some embodiments, the unbiased estimator of Equation (7) may be replaced with an estimator that reuses the current projection estimate at each basis function resulting in:

$$\tilde{L}_o^{new}(x_i, \omega_i^o) = L_e(x_i, \omega_i^o) + \quad \text{Equation (12)}$$
$$\tilde{L}_{o,h}^{curr}(x_{i+1}, \omega_{i+1}^o) f_i(\omega_i^i, \omega_i^o) G(x_i, x_{i+1}) \cdot \frac{w(x_{i+1} \mid x_i)}{p(x_{i+1} \mid x_i)}$$

where $\tilde{L}_{o,h}^{curr}$ is a current estimate for the outgoing radiance projected over basis function $b_h$. Even though this definition applies the transport operator only once, since it transports $\tilde{L}_{o,h}^{curr}$, its iterative application will lead to the full solution of the rendering equation.

In various embodiments, the updates by the directional radiance manager 108 to the outgoing radiance fields may be applied to Equation (11) and Equation (12). In further examples, the estimator of the ray caster 104 may solve the rendering equation for any number of light transport path cast in a scene over multiple frames. For example, paths may be cast in waves (e.g., by sampling one path per-pixel and per-frame), and the updates may be performed in a frame using the approximations corresponding to the previous frame. This approach may be referred to a progressive path tracing and may be implemented to trace any of the various light transport paths described herein, such as in FIG. 2, 3, 5, or 6. s Examples of Hierarchy of Finite Elements In embodiments, a hierarchy of finite elements $H_l$ is employed where l represents the level of detail. For example, the hierarchy of finite elements may be implemented using the mipmap 400 and texels as described herein, the spatial hashing scheme, and/or based on the characteristics used to determine regions of shared directional radiance described herein. Thus, the appropriate hierarchy level may be selected using any of a variety of potential factors or characteristics described herein, such as a path footprint approximation. The hierarchy of finite elements $H_l$ may be incorporated into Equation (12) by replacing $\tilde{L}_{o,h}^{curr}$ with a selected hierarchy level $\tilde{L}_{o,h,l}^{curr}$.

Examples of Temporal Accumulation

As described herein, in embodiments where lighting condition data is at least temporally shared between finite elements (e.g., in accordance with FIG. 3), temporal averaging may be employed in combining samples in order to accommodate for dynamic scene updates. For example, non-linear temporal averaging may be used to give more weight to new samples than older samples.

In some embodiments, temporal averaging may be implemented by tracking a counter $C_h^{old}$ and $C_h^{new}$ for each basis function, corresponding to the cumulative counters up to the old or previous frame, and new counters for the new or current frame. When Equation (11) is applied, it may use the following weighted average:

$$\tilde{L}_{o,h}^{new} = (1 - \alpha^{new}) \cdot \tilde{L}_{o,h}^{old} + \quad \text{Equation (13)}$$
$$\alpha^{new} \cdot \sum_{p=1}^{N} \tilde{L}_o^{new}(x_{p,i}, \omega_{p,i}^o) \frac{b_h(x_{p,i}, \omega_{p,i}^o) w(x_{p,i} \mid x_{p,i-1})}{c_h^{new}}$$

where $\alpha^{new}$ is a blending coefficient which may be computed as:

$$\alpha^{new} = \max(\sqrt{c_h^{new}/(c_h^{old} + c_h^{new})}, T_{max}^{-1}) \quad \text{Equation (14)}$$

and where $T_{max}$ may be a system and/or user-defined constant that can be used to limit the size of the temporal window. The presence of the square root inside the blending coefficient $\alpha^{new}$ may be used to make the weighted average a hybrid between linear accumulation (which would be obtained without the square root), and exponential weighting, which would be obtained with a constant blending coefficient. The counters $C_h^{old}$ and $C_h^{new}$ may be reset (e.g., zeroed) locally, and/or on demand, for example, according to determinations designed to detect local changes, or globally, based on determinations designed to detect large structural changes to geometry or illumination.

Additional Examples of Shared Lighting Condition Data

While equations described herein have focused on examples based on outgoing radiance fields, in various embodiments, finite elements and/or regions of directional radiance that are shared between light transport paths may additionally or alternatively be representative of in-coming radiance and/or directional radiance derived from incoming and/or outgoing radiance, such as using a local BRDF (e.g., in an incoming radiance distribution), emitted spectral radiance (e.g., in all radiance transported at least once), and/or other lighting condition data. Updates to regions and/or finite elements may occur similar to what has been described with respect to outgoing directional radiance, such as in FIG. 5 and/or in a progressive path tracer.

Outgoing and incoming radiance may be related by:

$$L_i = GL_o \quad \text{Equation (15)}$$

where G is the propagation operator.

The update equations, as counterparts to Equation (11) and Equation (12) for encoding incoming radiance, may then be:

$$\tilde{L}_{i,h}^{new} \approx \sum_{p=1}^{N} \tilde{L}_i^{new}(x_{p,i}, \omega_{p,i}^i) \frac{b_h(x_{p,i}, \omega_{p,i}^i) w(x_{p,i} \mid x_{p,i-1})}{c_h} \quad \text{Equation (16)}$$

and $$\tilde{L}_i^{new}(x_i, \omega_i^j) = \tilde{L}_{o,h}^{curr}(x_{i+1}, \omega_{i+1}^o)G(x_i, x_{i+1}) \cdot \frac{w(x_{i+1} \mid x_i)}{p(x_{i+1} \mid x_i)} \quad \text{Equation (17)}$$

Additionally, the update equations, as counterparts to Equation (11) and Equation (12) for encoding the product of incoming radiance and the local BRDF (which may also be referred to as an incoming radiance distribution) denoted as $f\tilde{L}_i$, may be:

$$f\tilde{L}_{i,h}^{n,ew} \approx \quad \text{Equation (18)}$$
$$\sum_{p=1}^{N} f\tilde{L}_i^{new}(x_{p,i}, \omega_{p,i}^i) \frac{b_h(x_{p,i}, \omega_{p,i}^i)w(x_{p,i} \mid x_{p,i-1})}{c_h}$$

and $$f\tilde{L}_i^{new}(x_i, \omega_i^j) = \quad \text{Equation (19)}$$
$$\tilde{L}_{o,h}^{curr}(x_{i+1}, \omega_{i+1}^o) \cdot f_i(\omega_i^i, \omega_i^o)G(x_i, x_{i+1}) \cdot \frac{w(x_{i+1} \mid x_i)}{p(x_{i+1} \mid x_i)}.$$

Using disclosed approaches, product distributions may be directly handled without requiring that the product of separate approximations of the incoming light field and the local BRDF are computed on-the-fly during path tracing, which can be computationally expensive (although they may be in some embodiments). Additionally, on-the-fly computations may require BRDF representations that can easily be converted to the target basis functions, resulting in limited applicability to complex material models.

All radiance transported at least once, $L_o$-$L_e$, may be denoted as $L_{o\backslash e}$. In order to learn the corresponding projection $L_{o\backslash e}$, $L_e$ may be omitted from Equation (12) and other equations described herein.

While equations have been provided in a generalized form, such that all available sampling techniques may be used to update lighting contribution data, this need not be the case. For example, for path guiding applications some sampling techniques may be excluded to focus guided samples to areas that are not already covered by other techniques such as next-event estimation. This may result in a down-weighted field, including only one or some of the multiple importance sampling components (and hence with weights not summing up to one).

Additional Examples of Estimators and Control Methods Based on Shared Lighting Condition Data In at least one embodiment, lighting condition data may be used by the ray caster 104 for importance sampling in path guiding (which may also be referred to as guided path tracing). As non-limiting examples, importance sampling may be from either an approximate or shared representation of the incoming radiance distribution or a representation of the product of incoming radiance and the local BRDF that is learned on-the-fly, as described herein. Progressive path tracing may be used by the ray caster 104 to make the process unbiased. For example, using the product of incoming radiance and the local BRDF, during each frame, importance sampling may be performed using $f\tilde{L}_i^{old}$ from a previous frame, while updating an entirely separate approximation $f\tilde{L}_i^{new}$ that may be used in the next frame as $f\tilde{L}_i^{old}$.

To illustrate the forgoing, local path sampling may be viewed as a recursive solution of the rendering equation written in its integral form:

$$L_o(x, \varepsilon^o) = L_e(x, \varepsilon^o) + \int_\Omega L_i(x, \varepsilon^i) f_x(\varepsilon^i, \varepsilon^o) \cos(\theta^i) d\varepsilon^i \quad \text{Equation (20)}$$

Given a path vertex $x_1$ and an outgoing radiance direction $\varepsilon_j^o$, $L_o(x_j, \varepsilon_j^o)$ may be solved for by sampling a direction $\varepsilon_j^i$ according to some projected solid angle probability $p^\perp(\varepsilon_j^i \mid x_j)$ and using the single-sample estimator:

$$L_{o\backslash e}(x_j, \omega_j^o) \approx L_i(x_j, \omega^i) f_{x_j}(\omega_j^i, \omega_j^o) \frac{w(\omega_j^i \mid x_j)}{p^\perp(\omega_j^i \mid x_j)} \quad \text{Equation (22)}$$

which indicates that the changes due to the approximation-based importance sampling technique may be embedded in the vertex sampling probabilities $p^\perp(x_{j+1} \mid x_j) = p^\perp(\varepsilon_j^i \mid x_j)G(x_j, x_{j+1})$, and may not change the form of the final path sampling estimators.

In at least some embodiments, at each path vertex $x_j$, sampling by the ray caster 104 may be combined according to $f\tilde{L}_i$, with a defensive strategy based on the BSDF by means of multiple importance sampling. Similarly, other vertex sampling techniques, such as next-event estimation may be employed.

In accordance with some aspects of the disclosure, path sampling estimators may be implemented by the ray caster 104 and/or the lighting determiner 106 using shared lighting condition data as a control variate. Suppose an integration of a function $g(x)$, with another function $h(x)$ having a known integral $I_h$. An unbiased estimator of the integral of g may be obtained as:

$$E[g] \approx \frac{[g(x) - \beta h(x) + \beta I_h]}{p(x)} \quad \text{Equation (23)}$$

where $\beta$ is a control parameter. In this regard, the function $h(x)$ may be referred to as a control variate.

In accordance with embodiments of the disclosure, the control variate $h = f\tilde{L}_i(x_j, \varepsilon^i)$ may be employed with known integral $\tilde{L}_{o/e}(x_j, \varepsilon_j^i)$. This may be implemented by locally solving Equation (20) at each path vertex $x_j$ (e.g., using progressive path tracing). A corresponding estimator using the control variate may be defined as:

$$L_{o\backslash e}(x_j, \omega_j^o) \approx \quad \text{Equation (24)}$$
$$\left[L_i(x_j, \omega^i) f_{x_j}(\omega_j^i, \omega_j^o) - \beta f\tilde{L}_i(x_j, \omega_j^i) + \beta \tilde{L}_{o\backslash e}(x_j, \omega_j^o)\right] \cdot$$
$$\frac{w(\omega_j^i \mid x_j)}{p^\perp(\omega_j^i \mid x_j)}$$

In at least one embodiment, the estimator compromising the control variate may not necessarily be used at each path vertex $x_j$ of a light transport path. For example, the estimator compromising the control variate may be used for any combination of the path vertices, such as one or more of a first two vertices along a light transport path. Additionally, in some embodiments, control parameter $\beta$ may be optimized to obtain optimal variance reduction for the function $h(x)$. However, in other examples, a fixed control parameter $\beta$ may be employed, such as in a range of approximately 0.5 to approximately 1.

In accordance with some aspects of the disclosure, importance sampling may be combined with control variates. For example, an estimator may be used of the form:

$$E[g] \approx \frac{[g(x) - \beta^T h(x) + I_h]}{p_\alpha(x)} \quad \text{Equation (25)}$$

for several importance sampling techniques $p_1, \ldots, p_m$ where $p_\alpha$ is a weighted average of the probabilities $p_\alpha = \Sigma_i \alpha_i p_i$, h is a vector function $h = (p_m(x), \ldots, p_m(x))$ and $\alpha$ and $\beta$ are multi-dimensional parameters in $\mathbb{R}^m$.

A simpler estimator may be obtained, for example, using the defensive strategy, $p_0$, based on the BSDF at each vertex, and the approximation-based importance sampling strategy $p_1 = f\tilde{L}_i$, which may take the form:

$$E[g] \approx \frac{g(x) - \beta[p_1(x) - p_0(x)]}{p_\alpha(x)} \quad \text{Equation (26)}$$

where $\alpha = (\alpha_0, \alpha_1)$ may be a ratio of samples allocated to each of the two strategies, and may be a simple scalar control, as described herein.

Disclosed approaches may be compatible with unbiased or biased estimators of a solution to the rendering equation. In accordance with some embodiments, a predictor-corrector model may be employed, which may reduce overall error with the introduction of some bias. For example, the control variate estimator of Equation (24) with $\beta=1$ may be reparametrized as:

$$L_{o \backslash e}(x_j, \omega_j^o) \approx \cdot [\gamma(L_i(x_j, \omega^i) f_{x_j}(\omega^i_j, \omega^o_j) - f\tilde{L}_i(x_j, \omega^i_j)) + \quad \text{Equation (27)}$$

$$\tilde{L}_{o \backslash e}(x_j, \omega_j^o)] \cdot \cdot \frac{w(\omega^i_j \mid x_j)}{p^\perp(\omega^i_j \mid x_j)}$$

and applied to a predictor-corrector model, where the $\tilde{L}_{o/e}(x_j, \varepsilon_j^o)$ term plays the role of the predictor, and the difference $\gamma(L_i(x_j, \varepsilon^i) f_{x_j}(\varepsilon^i_j, \varepsilon^o_j) - f\tilde{L}_i(x_j, \varepsilon^i_j)))$ plays the role of the corrector. By setting <1, the solution may be biased toward the predictor. As in other embodiments described herein, the estimator may be used at any (e.g., every or one or more) path vertex along a light transport path. In some embodiments $\gamma=0$, and the estimator with this configuration may be used (e.g., only used) at a first diffuse path vertex in a light transport path. This may be used to implement path space filtering for interactions of primary rays that is capable of handling all-frequency lighting.

Examples of Lighting Reprojection

As described herein, in computing the lighting condition data for pixels, the lighting determiner 106 may optionally use the lighting reprojector 110. When used in combination with sharing directional radiance data, as described herein, this may result in the image 116, as opposed to the image 114. The lighting reprojector 110 may be used by the lighting determiner 106 to reproject directional radiances of light transport paths in computing the data representative of the lighting conditions. For example, instead of simply determining the combined directional radiance data at every visible surface (e.g., by looking up the cache), the lighting determiner 106 may use the lighting reprojector 110 to obtain and apply the directional radiance data at the second hits along the light transport paths previously sampled. The lighting determiner 106 may use this approach to effectively result in using a hybrid between the finite-element solver, and a plain Monte-Carlo path tracer—essentially taking the finite element solution for bounces 2, . . . , N, and using raw Monte Carlo sampling (or a different type of sampling) for the first bounce. This may result in the lighting contribution data for the first bounce being better defined, as it will not be smoothed like the finite-element solution.

The lighting determiner 106 may in some embodiments use the lighting reprojector 110 without sharing directional radiance data, as described herein, or more generally when computing lighting condition data for pixels using ray-tracing, such as path tracing. Thus, the forgoing example may be more generally stated as when using a light transport solver, instead of simply determining the directional radiance data at every visible surface, the lighting determiner 106 may use the lighting reprojector 110 to obtain and apply the directional radiance data (aggregate or otherwise) at the second hits along the light transport paths previously sampled.

Figure 6:
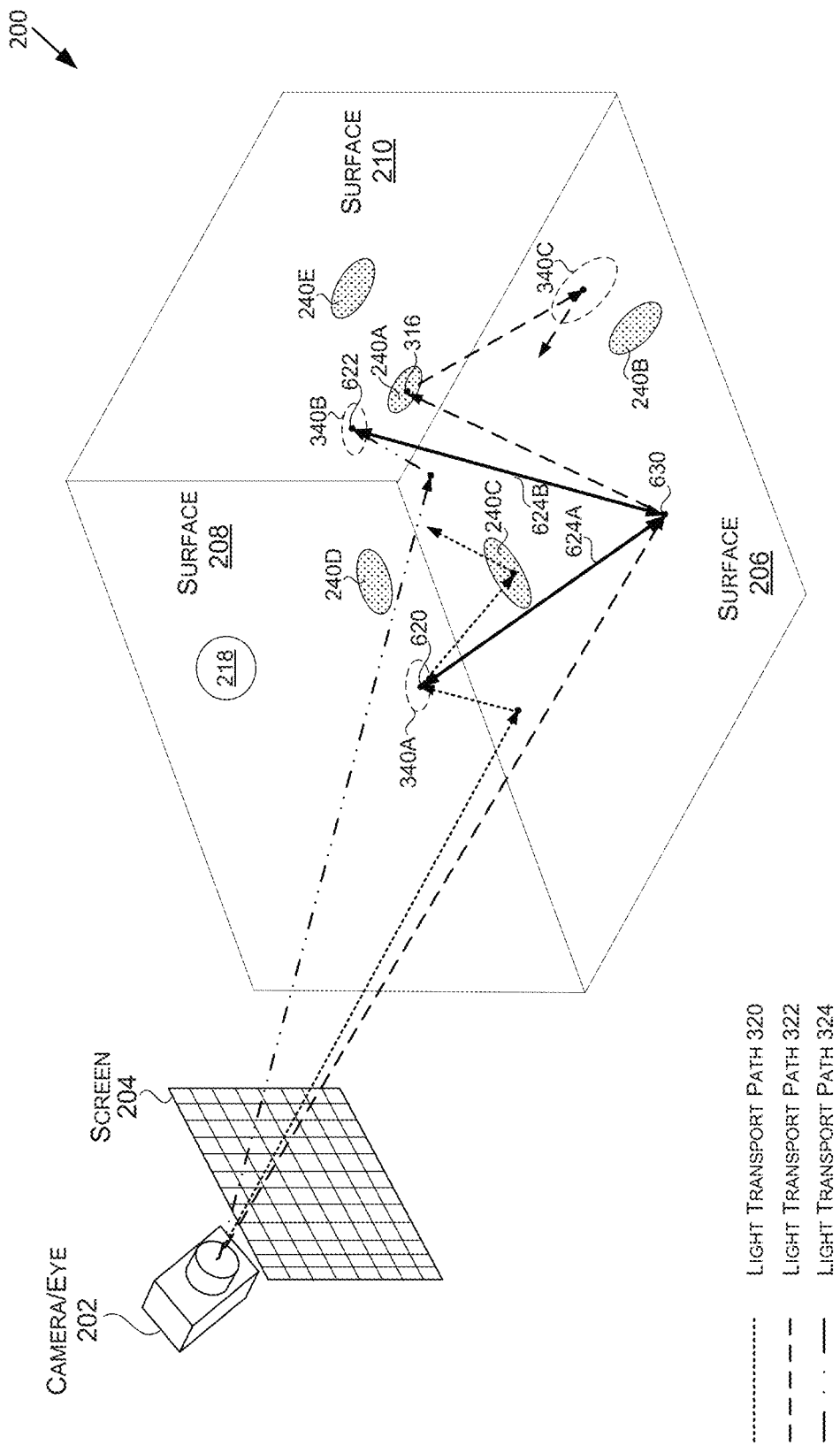
FIG. 6 is a diagram illustrating an example of applying an image filter to reproject directional radiances of light transport paths, in accordance with some embodiments of the present disclosure.

FIG. 6 is a diagram illustrating an example of reprojecting directional radiances of light transport paths, in accordance with some embodiments of the present disclosure. To illustrate the example above, instead of simply determining the directional radiance data at a point 630 of the surface 206, the lighting determiner 106 may use the lighting reprojector 110 to obtain and apply the directional radiance data (aggregate or otherwise) at the second hits along the light transport paths previously sampled, examples of which include the directional radiance data at a point 620 and a point 622, as indicated by arrows 624A and 624B in FIG. 6.

The lighting reprojector 110 may reproject directional radiance data using a filter, such as a cross-bilateral filter, that is applied in screen-space to the lighting condition data of the pixels. Applying the filter may function to reproject samples from neighboring pixels that fall within the filter's footprint, taking into account the physical configuration of the various (infinitesimal) surface elements involved. To do so, the lighting reprojector 110 may multiply each pixel's reprojection weight by the filter weight. The lighting reprojector 110 may filter for each pixel that is within a footprint (unless the render data for the pixel is discarded). This may involve convolving the render data for the pixels with the filter kernel of the image filter in which a weighted sum may be computed around each pixel.

The render data may include, for each pixel, the position, or location, p_h of what has been seen by the secondary ray of the pixel (e.g., the first secondary ray), the normal at that position N_h, and the directional radiance data, or color, C_h at that position. To apply the filter, the color may be obtained directly from the cache. When applying the filter, the lighting reprojector 110 may use the positions, normals, and directional radiance data for secondary bounces of adjacent pixels to compute each pixel's reprojection weight. The pixel's reprojection weight may be computed by, for each neighbor pixel, computing the geometric term between the visible point and the position of the neighbor pixel hit point (e.g., indicted by the arrows 624A and 624B in FIG. 6) multiplied by the directional radiance at that point, then combining the results into a weighted sum. This approach may capture how much of the light seen by secondary rays of neighbor pixels (e.g., at the points 620 and 622) is also seen by the pixel (e.g., at the point 630).

In some examples, the image filter is applied as a sliding window filter, and the footprint is an example of the sliding window. Also, the image filter may be a strided filter. Using the strided filter, when filtering for each pixel rather than considering the direct neighbors, striding may be applied so that spacing is introduced between the pixels. The striding may be, for example, one or two pixels. The filtering process may be equivalent to a low pass filter on the noise. By striding the filter, the frequency of the low pass filter is modified, resulting in clamps of light in the image, which may appear as splotches that are spread out at a higher frequency that is more pleasing to the human eye. An example of a suitable strided spatial filter is a strided box filter. The strided spatial filter may, as a non-limiting example, use anywhere from five to ten taps per pixel.

Figure 7:
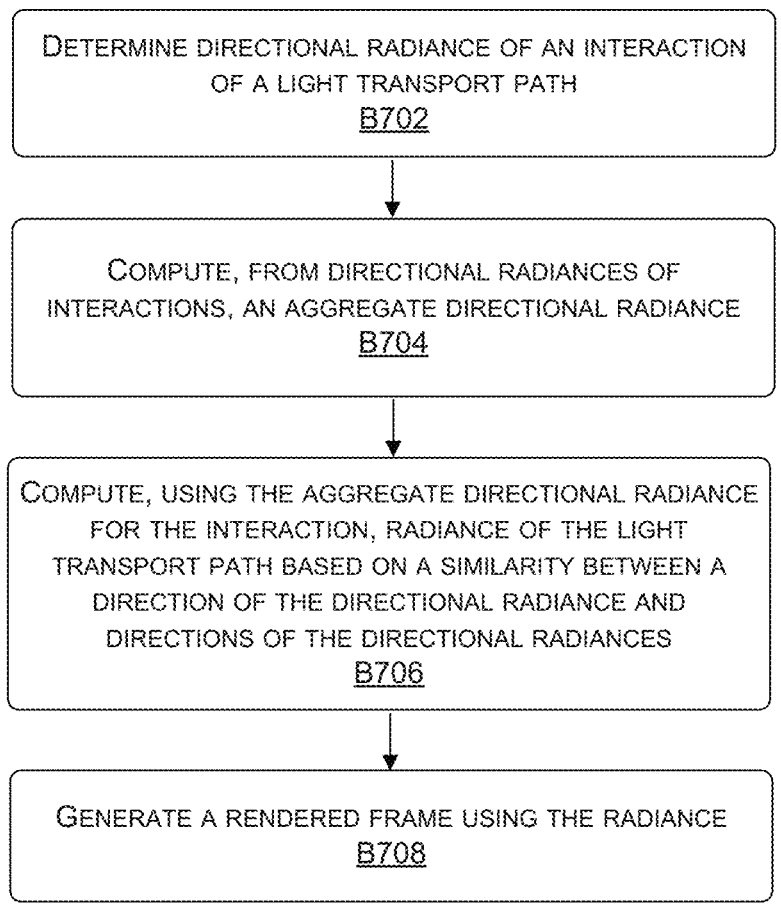
FIG. 7 is a flow diagram showing a method for rendering a virtual environment using shared directional radiances to determine contributions of interactions to radiance of light transport paths, in accordance with some embodiments of the present disclosure.

Now referring to FIG. 7, each block of a method 700, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the rendering system 100 (FIG. 1). However, these methods may additionally or alternatively be executed by any one system, or any combination of systems, including, but not limited to, those described herein.

FIG. 7 is a flow diagram showing the method 700 for rendering a virtual environment using shared directional radiances to determine contributions of interactions to radiance of light transport paths, in accordance with some embodiments of the present disclosure. The method 700, at block B702, includes determining directional radiance of an interaction of a light transport path. For example, the lighting determiner 106 may determine a directional radiance of an interaction of the ray 220B of the light transport path 220 at the point 216B of the virtual environment 200.

The method 700, at block B704, includes computing, from directional radiances of interactions, an aggregate directional radiance. For example, the lighting determiner 106 may compute, from directional radiances of interactions of one or more light transport paths with the virtual environment 200, an aggregate directional radiance based at least in part on similarities between directions of the directional radiances of the interactions.

The method 700, at block B706 includes computing, using the aggregate directional radiance for the interaction, radiance of the light transport path based on a similarity between a direction of the directional radiance and directions of the directional radiances. For example, the lighting determiner 106 may compute, using the aggregate directional radiance for the interaction, radiance of the light transport path 220 based at least in part on a similarity between a direction of directional radiance of the interaction and the directions of the plurality of directional radiances of the interactions.

The method 700, at block B708, includes generating a rendered frame using the radiance. For example, the image renderer 102 may generate a rendered frame corresponding to the image 114 and/or the image 116 using the radiance.

Figure 8:
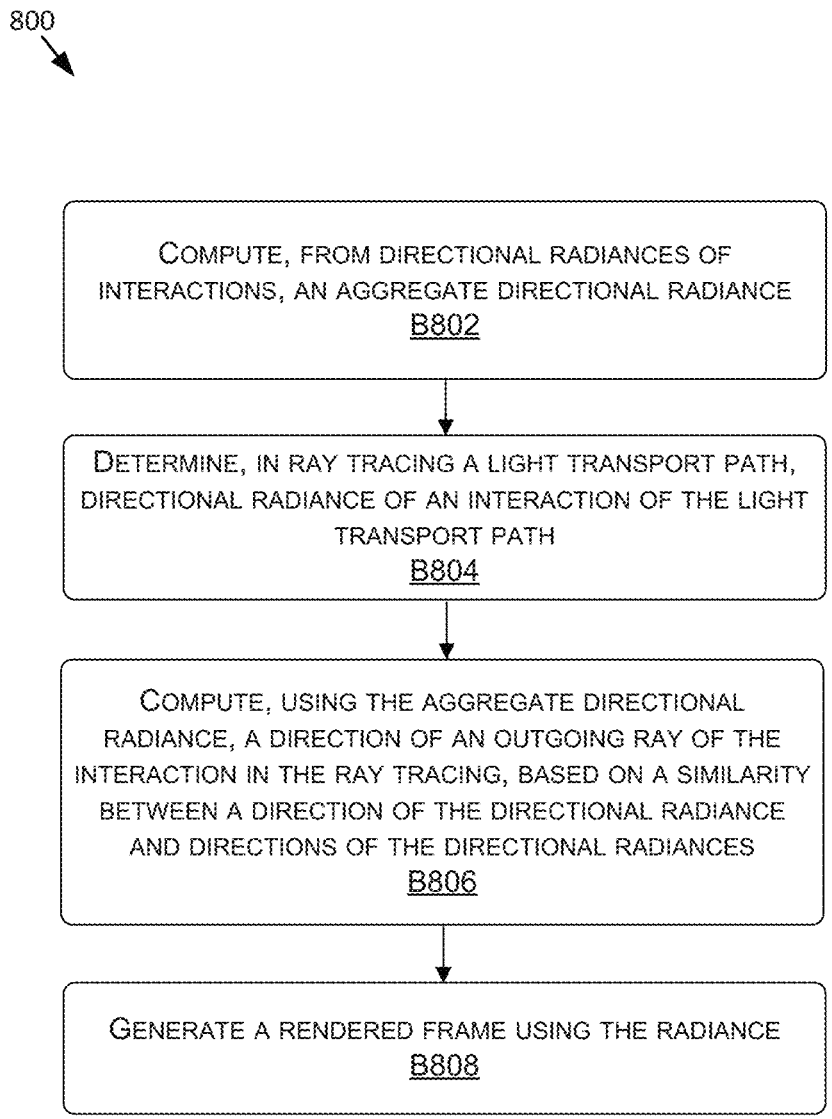
FIG. 8 is a flow diagram showing a method for rendering a virtual environment using shared directional radiances for path guiding light transport paths, in accordance with some embodiments of the present disclosure.

FIG. 8 is a flow diagram showing a method 800 for rendering a virtual environment using shared directional radiances for path guiding light transport paths, in accordance with some embodiments of the present disclosure.

The method 800, at block B802, includes computing, from directional radiances of interactions, an aggregate directional radiance. For example, the ray caster 104 may compute, from directional radiances of interactions of one or more light transport paths with the virtual environment 200, an aggregate directional radiance based at least in part on similarities between directions of the directional radiances of the interactions.

The method 800, at block B804, includes determining, in ray tracing a light transport path, directional radiance of an interaction of the light transport path. For example, the ray caster 104 may determine a directional radiance of an interaction of the ray 220B of the light transport path 220 at the point 216B of the virtual environment 200.

The method 800, at block B806 includes computing, using the aggregate directional radiance, a direction of an outgoing ray of the interaction in the ray tracing based at least in part on a similarity between a direction of the directional radiance and directions of the directional radiances. For example, the ray caster 104 may compute, using the aggregate directional radiance, a direction of the ray 220C of the interaction in the ray tracing the light transport path 220 based at least in part on a similarity between a direction of the directional radiance of the interaction and the directions of the plurality of directional radiances of the interactions.

The method 800, at block B808, includes generating a rendered frame using radiance of the light transport path. For example, the image renderer 102 may generate a rendered frame corresponding to the image 114 and/or the image 116 using radiance of the light transport path 220.

Figure 9:
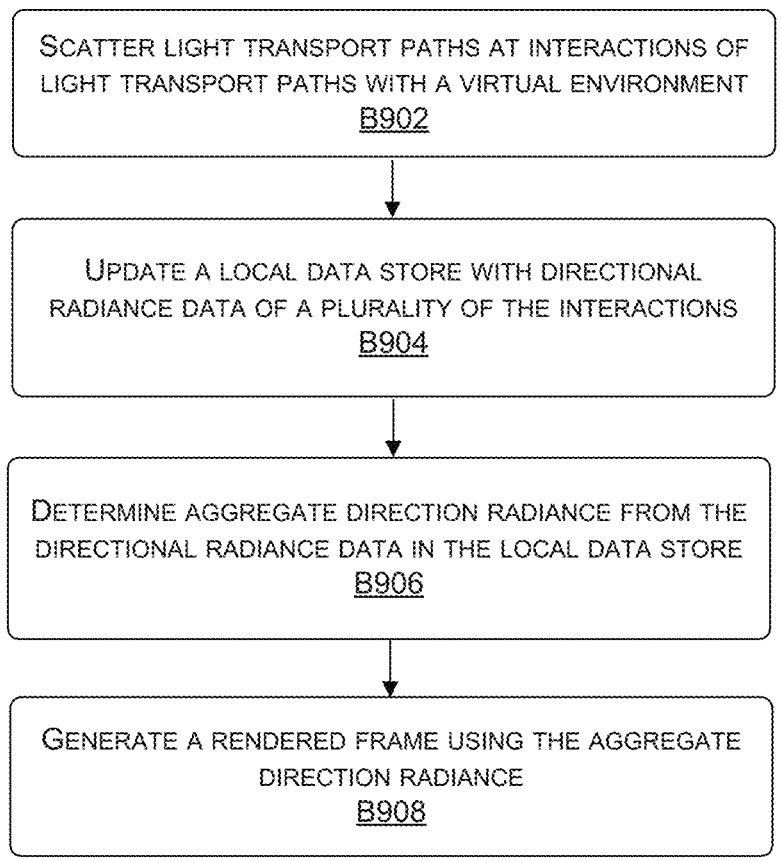
FIG. 9 is a flow diagram showing a method for rendering a virtual environment using shared directional radiances based on local data stores that correspond to interactions of light transport paths, in accordance with some embodiments of the present disclosure.

FIG. 9 is a flow diagram showing a method 900 for rendering a virtual environment using shared directional radiances based on local data stores that correspond to interactions of light transport paths, in accordance with some embodiments of the present disclosure.

The method 900, at block B902, includes scattering light transport paths at interactions of secondary rays. For example, the ray caster 104 may scatter the light transport paths 220, 222, and 224 in the virtual environment 200 at interactions of rays, such as the rays 220B, 222A, 220C, or 220D. The ray caster 104 may also sample the light transport paths from a perspective of a viewer in the virtual environment 200, such as via the camera 202. Further, the ray caster 104 may detect the interactions of the rays and scatter the light transport paths upon detecting the interactions.

The method 900, at block B904, includes updating a local data store with directional radiance data of a plurality of the interactions. For example, the directional radiance manager 108 may update, based on the scattering, a local cache at a texel and/or hash cell that corresponds to the region 240A (e.g., in a texture map) with directional radiance data of a plurality of the interactions based at least in part on locations of the interactions and directions of directional radiance associated with the interactions.

The method 900, at block B906, includes determining an aggregate directional radiance from the directional radiance data in the local data store. For example, the lighting determiner 106 may determine an aggregate directional radiance of the light transport path 220 from the directional radiance data in the local data store.

The method 900, at block B908, includes generating a rendered frame using the aggregate direction radiance. For example, the image renderer 102 may generate a rendered frame corresponding to the image 114 and/or the image 116 using the aggregate directional radiance.

Figure 10:
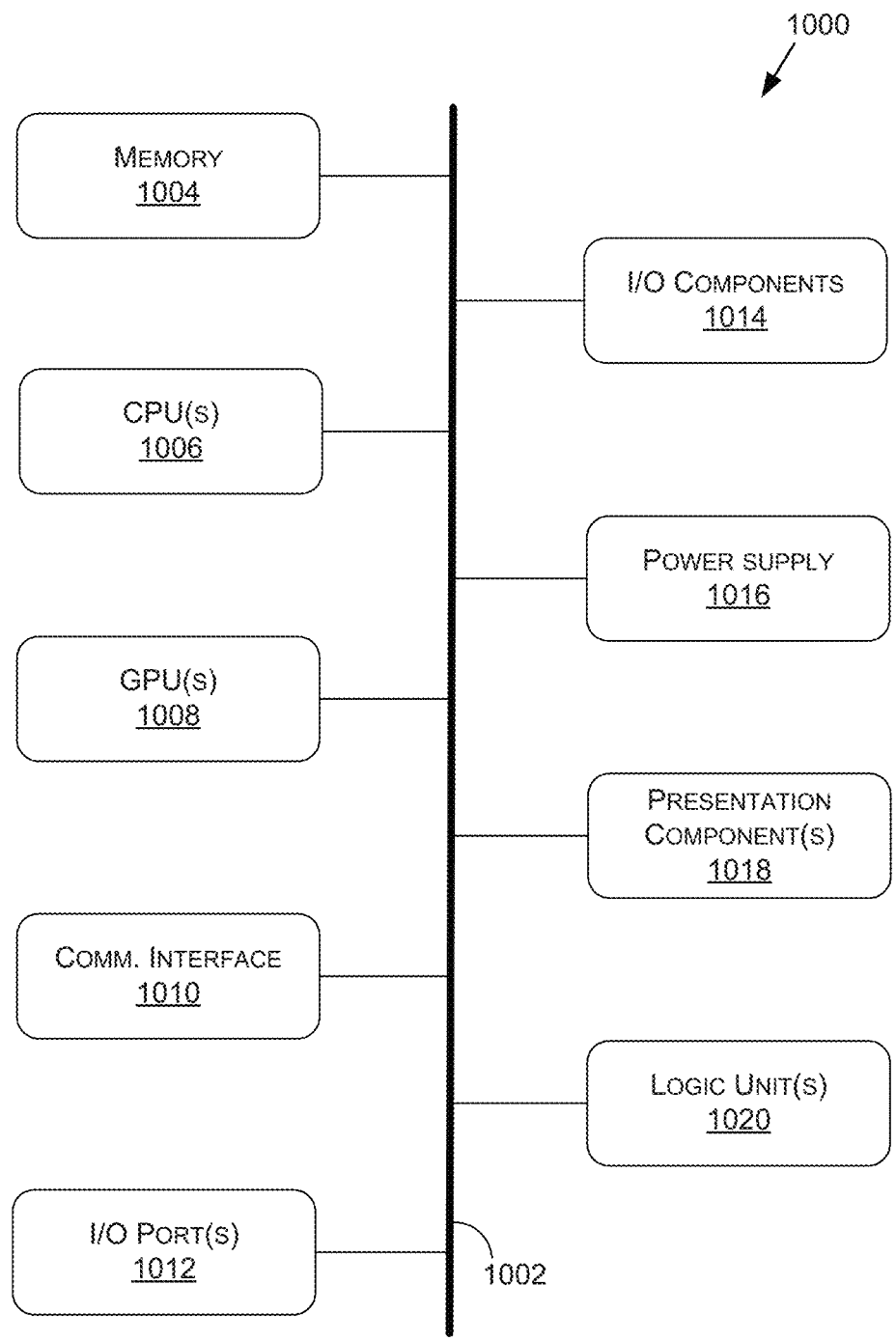
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, etc.), and output the data (e.g., as an image, video, sound, etc.).

Maintaining a Sparse Vector Field with Adaptive Resolution

Maintaining the data structure of a sparse vector field may include at least: Jittering and quantizing points in the domain of the multi-dimensional vector field, hashing a quantized key to at least two integer values using one or more (e.g., two) different hash functions, and/or using a first integer value of the integer values to determine the start position in a table for a linear scan that compares the content of the current cell with a second integer value of the integer values.

If the first and second integer values are either identical or the cell contains a sentinel value indicating that it is empty, iteration may stops. Then, either an entry with the same key has been found with a high probability, or there is no value stored yet. The index of the cell may be the index in the data table. Values in cells that contain a sentinel value indicating that it is empty may be reserved by atomically replacing them by the second integer value using the atomicCAS (atomic compare-and-swap). The (multi-dimensional) value may be atomically updated in the data table.

Quantization may depend on at least the point in the domain of the vector field. The maximum number of iterations may be an input parameter smaller or equal to the size of the table. In one or more embodiments, if the number of iterations goes beyond this number, a new entry cannot be inserted.

In a simple case, there may be a direct mapping from the point and a set of additional parameters such as camera position and user defined constants to a value that controls quantization, called "level." In this case, this level may be independent of any other values used to update the vector field.

Besides incorporating the point in the domain of the vector field and additional parameters, the mapping for the level may also depend on information computed from points already processed in the vector field. Applications include local densities of points and similarity of points quantized to the same value. Then, given a point in the domain of the vector field, the level may first be looked up. For a sparse vector field, it may be desirable to also maintain a sparse field storing the levels.

The lookup for the level may be similar to the lookup of the value of the vector field. Again, in the simple case, one may use a direct mapping from the point in the domain of the vector field and a set of additional parameters to the value that controls the quantization.

Using an adaptive resolution for the resolution of the field storing the level may create a chicken and egg problem: One would need a level for the lookup of the level. One solution is an additional search. Starting on one level, the system may check for the existence of higher levels using, for example, a linear or binary search. In order to allow for searching, only a small indicator may be placed as a placeholder on coarser levels to point out the existence of finer levels. Besides starting on a level defined by a heuristic, an auxiliary vector field with a fixed mapping may be used that stores a starting point for the search.

By maintaining counters in the data structure, levels may depend on local input point density.

It may be desirable to set quantization so that only points in the domain are quantized to the same value that have a certain similarity. Finite spatial differences may determine such a similarity by evaluating the input vector field in a set of points that are quantized to adjacent values, fixing all other parameters of the simulation, and computing their differences.

Both previously listed criteria may adapt the level for a given point in the domain over multiple iterations of an algorithm. Instead of discarding values on a level that is no longer used, they may be duplicated, for example, such that the cell in the domain is split, or values from the adjacent cells on the previous level may be combined such that the cells are merged. While merging may result in the same value as having used the adjusted level right from the start, splitting may propagate values to neighbors that may not be obtained at points in these cells otherwise. For example, the current value may hence receive a lower weight when combining with values of new iterations.

Using criteria that select different levels may result in selecting different levels for the same point in the domain depending on the other parameters. In that case a set of levels may be maintained by directly updating multiple levels from the entirety of the input vector field. Alternatively, only the finest levels of the vector field may be updated and the updates may be pushed to the coarser levels in a subsequent step.

It may be useful to leave some of the dimensions of the domain of the vector field dense. These dimensions may not be represented by the hash table(s) described herein, but instead may be represented by a secondary hash table that is stored in the cells of the original hash table in place of the vector field's value. Several dense representations may be supported, examples of which include: a kd-tree, a parametric mixture model, and a set of tabulated values. Specific use cases of these are mentioned below.

The vector field method may be applied to several types of light fields that may originate from a light transport simulation (rendering) or from measured data. Spatial dimensions may be parameterized using a hash table and directional dimensions using a dense data structure as described herein.

Light fields may be computed or estimated by a rendering algorithm, which may include but is not limited to physically-based light transport simulations. Multiple techniques may be used to compute/estimate a rendered light field, which may have different performance-accuracy tradeoffs.

Tracing complete light transport paths may allow for the unbiased estimation of the light field at the expense of more noise. This estimation technique may be useful when the light field is simple enough such that noisy data is sufficient for its reconstruction. An advantage may be that guarantees can be made concerning the eventual accuracy of the estimated light field due to the unbiasedness and/or consistency of the estimation.

In one or more embodiments light transport path segments may be traced and a technique similar to Q-learning may be used to make the light field learn from itself Existing light fields, such as for example environment maps, light emission profiles, light probes, and other measured real data, may be incorporated by not restricting the input light field to only rendered data.

A rendered or measured light field may be augmented in one or more embodiments.

The product of the light field and a cosine term may be integrated, yielding an irradiance field, which may be useful in many applications, including but not limited to accelerating shading computations in light-transport simulation.

The system may compute the product of the light field, a cosine term, and either the "bi-directional scattering distribution function" (BSDF) or the "phase function". The resulting product field may be useful in many applications, including but not limited to product sampling for faster light transport simulation, use as a control variate for faster light transport simulation, and for accelerating shading computations in light-transport simulations.

The product field may be computed, stored, and maintained on-the-fly. The directional component of the light field may be represented using a parametric mixture model and an additional sparse data structure may be maintained that represents the BSDF or phase function, where the spatial components as well as the incident directional components may be sparse (e.g., the aforementioned hash table), and the outgoing directional component may be densely represented as a parametric mixture model.

In this case, when matching parametric distributions are chosen (including but not limited to von Mises-Fisher distributions, Gaussian distributions, Kent distributions, Cauchy distributions, and piecewise polynomials), the product of the BSDF or phase function with the light field can be computed, integrated, and sampled efficiently in closed form, allowing for drastically accelerated rendering via importance sampling and the control variate technique.

The product field may be computed, stored, and maintained using as a backed-in product. Here, the product directly may be represented directly. The spatial component as well as the incident directional component of the product may be represented by the hash table(s) described herein and the outgoing directional component may be represented by a dense data structure. Here, the kd-tree, a dense tabulation, and a parametric mixture model are all suitable options. Learning the baked-in product directly may be more difficult than building the product on-the-fly, but it also may avoid associated computational cost and approximation errors.

While the light field is targeting the acceleration of ray tracing simulations, data from rasterization can also be used as input to methods described herein. Examples of such a hybrid application include using rasterization instead of primary rays and updating the light field by rasterizing from multiple viewports in world space.

Besides using points on surfaces, points in participating media may also be used as input to methods described herein.

The vector field may adapt to changes in the scene, for example, over time in an animation, due to editing, or in an interactive setting. In order to control precision, the influence of the previously computed values in the field may be determined. This decision may be local.

If the scene has not changed, all input values may be combined. For a number n of previous values, the cumulative moving average may be updated with the new value x to $v_{n+1} = n/(n+1)*v_n + 1/(n+1)*x$ Old invalid values of the field may be faded out by using an exponential moving average in which the parameter \alpha may determine the speed of the decay. The field may be updated with the new value x to $v_{n+1} = (1-\alpha)*v_n + \alpha*x$. The cumulative moving average can be seen as a special case of the exponential moving average in which \alpha:=1/(n+1)

The scene may be considered static, or a global exponential decay of the old vector field may be used. However, scenes often are locally static so that the change in the field vastly varies throughout the domain of the vector field. It may be desirable to estimate this change, and finite differences can serve as such an estimate. The finite difference may be computed by evaluating the simulation in the same points in the domain before and after adaptation, also fixing other parameters of the simulation (e.g., all other parameters), and computing their difference. The magnitude of this difference may then be used to control the parameter \alpha of an exponential moving average.

Additional Example Embodiments

The disclosure provides, in part, a method for creating and maintaining a sparse approximation of a vector field, the method comprising receiving, as input, samples from a vector field, determining a plurality of points in the domain of the vector field; for a plurality of the points in the domain of the vector field, refining the approximated sparse vector field by: at least one of updating or refining, based on the value of the vector field at one point in the domain of the vector field, the sparse vector field at a same first point in the domain of the vector field; at least one of updating or refining, based on the value of the vector field at one point in the domain of the vector field, the sparse vector field at a same second point in the domain of the vector field; at least one of updating or refining, based on the value of the sparse vector field at one point in the domain of the vector field in the sparse vector field, the sparse vector field at the second point in the domain of the vector field; and applying one or more operations to the at least one of the updated or refined sparse vector field.

In one or more embodiments, the vector field is at least one of: a radiance field multiplied by the phase function of a participating medium; a radiance field multiplied by a cosine term relative to a surface normal; or a radiance field multiplied by a bidirectional scattering distribution function on a surface.

In one or more embodiments, the radiance field is obtained by at least one of a measurement or a light transport simulation.

In one or more embodiments, the points in the domain are specified by vertices of light transport paths.

In one or more embodiments, the light transport paths are generated by at least one of: rasterization from a plurality of points in the domain; or ray tracing from a plurality of points in the domain.

In one or more embodiments, the one point and the second point in the domain for updating or refining the sparse light field are given by at least one of: one or more adjacent vertices of a light path; or sampling two points in the domain.

In one or more embodiments, the method includes creating and maintaining an approximation of at least one of: a phase function of a participating medium; or a bidirectional scattering distribution function on a surface.

In one or more embodiments, the sparse approximation of the vector field is continually adapted to changes in the vector field.

In one or more embodiments, the adaptation of the sparse approximation of the vector field is performed using an exponential moving average.

In one or more embodiments, the parameters of the exponential moving average depend on local finite differences.

In one or more embodiments, the sparse approximation of a vector field is sparse in at least one of the dimensions of the domain of the vector field and dense in the other dimensions of the domain of the vector field.

In one or more embodiments, the dense dimensions are represented by at least one of: a two-dimensional Kd-tree; a two-dimensional mixture model of parametric probability distributions; or a set of tabulated values.

In one or more embodiments, the parametric probability distributions are at least one of: a Gaussian distribution; a von Mises-Fisher distribution; a Bingham distribution; a Kent distribution; or a Cauchy distribution.

In one or more embodiments, the encoding of the sparse dimensions of the domain of the vector field comprises applying at least one hashing scheme.

In one or more embodiments, the sparse dimensions of the domain of the vector field are quantized.

In one or more embodiments, the sparse dimensions of the domain of the vector field are jittered before applying a quantization method.

In one or more embodiments, the applying the one or more operations comprises at least one of: calculating a control variate for a plurality of points in the domain of the vector field from the approximation of the vector field; computing an estimate of the vector field for the plurality of points in the domain of the vector field, wherein the estimate is calculated using the difference between the value of the vector field and the control variate; or performing importance sampling of the input approximation of the vector field.

In one or more embodiments, the quantization method depends on at least one of: a fixed constant provided as input to the method; a heuristic; or a secondary sparse vector field.

In one or more embodiments, the quantization method depends on a heuristic, the heuristic comprising at least one of: an estimated projected pixel footprint at the point in the domain of the vector field in a light transport simulation; or a path footprint at the point in the domain of the vector field in a light transport simulation.

In one or more embodiments, a multitude of sparse approximations of the same vector field is maintained, wherein each the approximation is quantized using a different quantization method.

In one or more embodiments, the quantization method of the secondary sparse vector field approximation depends on at least one of: a fixed constant, provided as input to the method; or the heuristic.

In one or more embodiments, each operation on at least one of the multitude of sparse approximations of the vector field affects at least one of the multitude of sparse approximations.

In one or more embodiments, the at least one approximation for the operation is selected by searching among the multitude of approximations for a specified criterion.

In one or more embodiments, the criterion is the resolution of the quantization.

In one or more embodiments, the method is further comprising, based on the specified criterion, executing at least one of: creating at least one new sparse approximation by duplicating part of at least one of the multitude of sparse approximations; or merging part of at least two of the sparse approximations.

In one or more embodiments, the specified criterion is at least one of a density of the points in the domain of the vector field; or a threshold on spatial finite differences that is input to the method.

In one or more embodiments, searching starts at one of the multitude of sparse approximations, where the one sparse approximation is selected by a secondary sparse vector field.

In one or more embodiments, the vector field comprises the secondary sparse vector field.

The disclosure provides, in part, a method for refining an approximated a multi-dimensional light field, the method comprising: receiving, as input, an approximated multi-dimensional light field of a rendered scene, the approximated multi-dimensional light field comprising a plurality of light paths; sampling the plurality of light paths; determining a plurality of light path vertices corresponding to the sampled plurality of light paths; for each light path vertex of the plurality of light path vertices, refining the approximated multi-dimensional light field by: iteratively updating, based on a current light path vertex from the multi-dimensional light field, an output approximation at a previous light path vertex along a same light path; traversing to the next light path along the same light path until an end vertex of the same light path is reached; and applying one or more operations to the refined approximated multi-dimensional light field.

In one or more embodiments, the approximated multi-dimensional light field comprises a five (5) dimensional light field.

In one or more embodiments, the 5-dimensional light field represents an outgoing light field at each surface in the scene.

In one or more embodiments, the 5-dimensional light field represents an incoming light field at each surface in the scene.

In one or more embodiments, the approximated multi-dimensional light field comprises a seven (7) dimensional light field.

In one or more embodiments, the 7-dimensional light field represents a product of an incoming light field with a local Bidirectional Scattering Distribution Function ("BRDF") at each surface in the scene.

In one or more embodiments, the method is further comprising encoding a positional component and an outgoing direction of each light path vertex.

In one or more embodiments, the method is further comprising encoding a variation in an incoming direction of each light path vertex.

In one or more embodiments, the encoding the variation in the incoming direction comprises encoding using at least one of: a 2-dimensional KD-tree; a 2-dimensional Gaussian Mixture Model; or a set of tabulated values.

In one or more embodiments, the encoding comprises applying a hashing scheme.

In one or more embodiments, applying the hashing scheme comprises encoding a positional component and outgoing and incoming directions of each light path vertex.

In one or more embodiments, the applying the one or more operations comprises at least one of: calculating a control variate at each sampled light path vertex of the refined multi-dimensional light field approximation; computing an unbiased path sampling estimate for an outgoing light field at each sampled light path vertex of the refined multi-dimensional light field approximation, wherein the path sampling estimate is calculated using the difference between the sampled light path value and a control variate; or optionally sampling one or more new light path vertices by performing importance sampling of the input approximated multi-dimensional light field and computing unbiased sample weights to correct for an importance sampling distribution.

The disclosure provides, in part, a method to encode a multi-dimensional light field approximation, the method comprising: receiving a multi-dimensional light field approximation, the multi-dimensional light field approximation comprising a plurality of sampled light paths, each sampled light path of the plurality of sampled light paths comprising a plurality of light path vertices; determining an encoding direction; for each light path vertex in a sampled light path: hashing a quantized positional component of each light path vertex together with either: a quantized outgoing light field contribution to a previous vertex along the sampled light path when the encoding direction corresponds to a backward direction or a quantized incoming light field contribution to a next vertex along the sampled light path when the encoding direction corresponds to a forward direction.

In one or more embodiments, the hashing comprise applying a sparse hashing scheme.

In one or more embodiments, the multi-dimensional light field comprises a five (5) dimensional light field.

In one or more embodiments, the 5-dimensional light field represents an outgoing light field at each surface in the scene.

In one or more embodiments, the 5-dimensional light field represents an incoming light field at each surface in the scene.

In one or more embodiments, the multi-dimensional light field comprises a seven (7) dimensional light field.

In one or more embodiments, the 7-dimensional light field represents a product of an incoming light field with a local Bidirectional Scattering Distribution Function ("BRDF") at each surface in the scene.

In one or more embodiments, the method is further comprising encoding a positional component and an outgoing direction of each light path vertex.

In one or more embodiments, the method is further comprising encoding a variation in an incoming direction of each light path vertex.

In one or more embodiments, the encoding the variation in the incoming direction comprises encoding using at least one of: a 2-dimensional KD-tree; a 2-dimensional Gaussian Mixture Model; or a set of tabulated values.

In one or more embodiments, the encoding comprises applying a hashing scheme.

In one or more embodiments, applying the hashing scheme comprises encoding a positional component and outgoing and incoming directions of each light path vertex.

In one or more embodiments, the applying the one or more operations comprises at least one of: calculating a control variate at each sampled light path vertex of the refined multi-dimensional light field approximation; computing an unbiased path sampling estimate for an outgoing light field at each sampled light path vertex of the refined multi-dimensional light field approximation, wherein the path sampling estimate is calculated using the difference between the sampled light path value and a control variate; or optionally sampling one or more new light path vertices by performing importance sampling of the input approximated multi-dimensional light field and computing unbiased sample weights to correct for an importance sampling distribution.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    determining, for a ray in a simulated light transport path of one or more simulated light transport paths within a virtual environment, a direction of directional radiance corresponding to the ray, the ray being of a first interaction of the simulated light transport path, wherein the simulated light transport path includes a plurality of rays extending from a viewpoint to a light source;
    computing, based at least on similarities between second interactions of the one or more simulated light transport paths within the virtual environment, an aggregate directional radiance of directional radiances of the second interactions;
    based at least on a similarity between the direction of the directional radiance of the ray of the first interaction and one or more directions corresponding to the directional radiances of the second interactions of the one or more simulated light transport paths;
        computing a direction of an outgoing ray of the plurality of rays of the simulated light transport path based at least on scattering the ray using the aggregate directional radiance, and
        based at least on the computing of the direction, casting the outgoing ray from the first interaction;
    computing, from the light source over the simulated light transport path, the directional radiance of the ray; and
    generating a rendered frame representative of the virtual environment using the computed directional radiance to compute radiance of the simulated light transport path.

2. The method of claim 1, wherein the directional radiances comprise outgoing directional radiances of the second interactions and the directional radiance comprises outgoing directional radiance of the first interaction.

3. The method of claim 1, wherein the computing the radiance of the simulated light transport path comprises determining a contribution of the first interaction to the radiance using the aggregate directional radiance as a control variate.

4. The method of claim 1, wherein the aggregate directional radiance corresponds to a prior rendered frame to the rendered frame, and the method further includes:
    updating the aggregate directional radiance using the simulated light transport path to generate updated aggregate directional radiance corresponding to the rendered frame;
    casting one or more rays of a second simulated light transport path using the updated aggregate direction radiance; and
    generating a subsequent rendered frame to the rendered frame using the second simulated light transport path.

5. The method of claim 1, wherein the computing the radiance comprises selecting the aggregate directional radiance for the computing the radiance of the simulated light transport path based at least on a result of a hash function, the hash function having a dimension that corresponds to a position of the first interaction of the ray and the direction of the directional radiance.

6. The method of claim 1, wherein the computing the radiance of the simulated light transport path comprises determining a contribution of the first interaction to the radiance using the aggregate directional radiance as a predictor in a predictor-corrector model.

7. The method of claim 1, wherein the aggregate directional radiance corresponds to a finite element of a discretized finite element rendering equation solution for the simulated light transport path.

8. The method of claim 1, further comprising updating the aggregate directional radiance using a different aggregate directional radiance that corresponds to a subsequent interaction in the simulated light transport path based at least on a direction of the outgoing ray of the first interaction.

9. The method of claim 1, wherein the simulated light transport path is a path traced light transport path that passes through a screen position of a screen in the virtual environment, the one or more simulated light transport paths are one or more path traced light transport paths that pass through one or more screen positions of the screen, the radiance of the simulated light transport path is computed at the screen position, and one or more radiances of the one or more simulated light transport paths are computed at the one or more screen positions.

10. The method of claim 1, wherein the simulated light transport path is iteratively generated based at least on tracing the plurality of rays over a plurality of frames and transporting radiance from the light source to the viewpoint over the plurality of frames.

11. A method comprising:
    computing, from directional radiances of interactions of one or more ray-traced light transport paths within a virtual environment, an aggregate directional radiance based at least on similarities between the interactions, directions of the directional radiances corresponding to one or more rays of the interactions;
    determining, in ray tracing a light transport path that includes a plurality of rays extending from a viewpoint to a light source, a first direction of directional radiance of an incoming ray in the light transport path, the incoming ray being of an interaction of the light transport path within the virtual environment;

computing, from the light source over the light transport path based at least on scattering the incoming ray using the aggregate directional radiance as the directional radiance for the incoming ray, a second direction of an outgoing ray in the light transport path, the outgoing ray being of the interaction in the ray tracing the light transport path, the computing being based at least on a similarity between the first direction of the directional radiance of the incoming ray and the directions of the directional radiances of the interactions;

based at least on the computing of the second direction, casting the outgoing ray from the interaction; and generating a rendered frame of the virtual environment using the second direction of the outgoing ray.

12. The method of claim 11, wherein the aggregate directional radiance corresponds to a finite element of a discretized finite element rendering equation solution.

13. The method of claim 11, wherein the computing the second direction of the outgoing ray comprises sampling the second direction using a sampling probability that is defined at least by the aggregate directional radiance.

14. The method of claim 11, wherein the computing the second direction of the outgoing ray comprises sampling the second direction using the aggregate directional radiance as a control variate.

15. The method of claim 11, wherein the aggregate directional radiance comprises outgoing directional radiance of the interactions.

16. The method of claim 11, wherein the aggregate directional radiance comprises aggregated incoming directional radiance distributions of the interactions.

17. A method comprising:

rendering a ray-traced image using one or more graphics processing units (GPUs), the rendering including:

evaluating a similarity between a direction of directional radiance of a ray in a ray-traced light transport path within a virtual environment and directions of directional radiances of interactions of ray-traced light transport paths within the virtual environment, wherein the ray-traced light transport path includes a plurality of rays extending from a viewpoint to a light source, and based at least on the similarity:

computing a direction of an outgoing ray of the plurality of rays of the ray-traced light transport path based at least on scattering the ray using an aggregate directional radiance of the directional radiances, casting the outgoing ray from an interaction of the ray-traced light transport path with the virtual environment based at least on the computing of the direction, and determining, from the light source over the ray-traced light transport path the directional radiance of the ray.

18. The method of claim 17, wherein the aggregate directional radiance corresponds to a finite element of a discretized finite element rendering equation solution.

19. The method of claim 17, wherein the ray-traced image corresponds to a first frame, and the aggregate directional radiance corresponds to a second frame that is prior to the first frame.

20. The method of claim 17, further comprising:

generating updated aggregate directional radiance from the aggregate directional radiance using a different aggregate directional radiance that corresponds to a subsequent interaction in the ray-traced light transport path based at least on a second direction of a second outgoing ray of the subsequent interaction; and rendering a second ray-traced image that follows the ray-traced image using the one or more graphics GPUs and the updated aggregate directional radiance.

21. The method of claim 17, wherein the rendering the ray-traced image further includes determining a solution of a light transport solver for the ray-traced light transport path using the aggregate directional radiance to determine a directional radiance value for the interaction.

* * * * *